US008547121B2

(12) United States Patent
Ounadjela et al.

(10) Patent No.: US 8,547,121 B2
(45) Date of Patent: Oct. 1, 2013

(54) QUALITY CONTROL PROCESS FOR UMG-SI FEEDSTOCK

(75) Inventors: Kamel Ounadjela, Belmont, CA (US); Marcin Walerysiak, Skrzeszew (PL); Anis Jouini, Grenoble (FR); Matthias Heuer, Berlin (DE); Omar Sidelkheir, Sunnyvale, CA (US); Alain Blosse, Belmont, CA (US); Fritz Kirscht, Berlin (DE)

(73) Assignee: Silicor Materials Inc., Palo Alto, CA (US)

( * ) Notice: Subject to any disclaimer, the term of this patent is extended or adjusted under 35 U.S.C. 154(b) by 489 days.

(21) Appl. No.: 12/770,688

(22) Filed: Apr. 29, 2010

(65) Prior Publication Data
US 2010/0327890 A1 Dec. 30, 2010

Related U.S. Application Data

(63) Continuation-in-part of application No. 12/703,727, filed on Feb. 10, 2010.

(60) Provisional application No. 61/173,853, filed on Apr. 29, 2009, provisional application No. 61/260,391, filed on Nov. 11, 2009.

(51) Int. Cl.
*G01R 21/36* (2006.01)
*G01R 27/08* (2006.01)
*C30B 13/00* (2006.01)
*C30B 11/00* (2006.01)
*C30B 21/06* (2006.01)
*C30B 21/04* (2006.01)

(52) U.S. Cl.
USPC ........... 324/719; 324/691; 117/222; 117/223; 117/13; 117/21

(58) Field of Classification Search
USPC ......... 324/719, 663, 691, 693, 717; 423/348, 423/349, 350
See application file for complete search history.

(56) References Cited

U.S. PATENT DOCUMENTS 6,011,810 A 1/2000 Haller et al.
6,942,730 B2 9/2005 Han
(Continued)

FOREIGN PATENT DOCUMENTS

CN 102598272 A 7/2012
JP 2012525316 A 10/2012
(Continued)

OTHER PUBLICATIONS

Bruno Ceccaroli and Otto Lohne, Solar Grade Silicon Feedstock, 2003 John Wiley & Sons, Ltd ISBN: 0-471-49196-9, pp. 153-204.*

(Continued)

*Primary Examiner* — Jermele M Hollington
*Assistant Examiner* — Christopher McAndrew
(74) *Attorney, Agent, or Firm* — Schwegman Lundberg & Woessner, P.A.

(57) ABSTRACT

A quality control process for determining the concentrations of boron and phosphorous in a UMG-Si feedstock batch is provided. A silicon test ingot is formed by the directional solidification of molten UMG-Si from a UMG-Si feedstock batch. The resistivity of the silicon test ingot is measured from top to bottom. Then, the resistivity profile of the silicon test ingot is mapped. From the resistivity profile of the silicon test ingot, the concentrations of boron and phosphorous of the UMG-Si silicon feedstock batch are calculated. Additionally, multiple test ingots may be grown simultaneously, with each test ingot corresponding to a UMG-Si feedstock batch, in a multi-crucible crystal grower.

16 Claims, 30 Drawing Sheets

(56) References Cited

U.S. PATENT DOCUMENTS

| | | | |
|---|---|---|---|
| 7,141,114 B2* | 11/2006 | Spangler et al. | 117/81 |
| 2008/0197454 A1* | 8/2008 | Rakotoniana et al. | 257/617 |
| 2008/0206123 A1* | 8/2008 | Enebakk et al. | 423/349 |
| 2009/0026423 A1* | 1/2009 | Kirscht et al. | 252/512 |
| 2009/0091339 A1* | 4/2009 | Chen et al. | 324/719 |
| 2010/0310445 A1 | 12/2010 | Ounadjela et al. | |

FOREIGN PATENT DOCUMENTS

| | | |
|---|---|---|
| JP | 2012525322 A | 10/2012 |
| WO | WO-2010126639 A1 | 11/2010 |
| WO | WO-2010127184 A1 | 11/2010 |

OTHER PUBLICATIONS

E. Fourmond, C. Ndzogha, D. Pelletier, Y. Delannoy, C. Trassy, Refining of Metallurgical Silicon for Crystalline Solar Cells, 19th European Photovoltaic Solar Energy Conference, Jun. 7-11, 2004, Paris, France, pp. 1017-1020.*

Chandra P. Khattak, David B. Joyce, Frederick Schmid "A simple process to remove boron from metallurgical grade silicon" 2002 Elsevier Science B.V. 74 pp. 77-89.*

Bruno Ceccaroli and Otto Lohne "Handbook of Photovoltaic Science and Engineering chapter 5: Solar Grade Silicon Feedstock", 2003 John Wiley & Sons, Ltd. ISBN: 0-471-49196-9 pp. 179-202.*

E. Fourmond, C. Ndzogha, D. Pelletier, Y. Delannoy, C. Trassy Y. Caratini, Y Baluais, R. Einhaus, S. Martinuzzi, I. Perichaud "Refining of Metallurgical Silicon for crystalline solar Cells", 19th European Photovoltaic Solar Energy Conference, Jun. 7-11, 2004 Paris, France pp. 1-4.*

"U.S. Appl. No. 12/703,727, Preliminary Amendment mailed Apr. 26, 2010", 4 pgs.

"International Application Serial No. PCT/US2010/033062, Search Report mailed Sep. 8, 2010", 3 pgs.

"International Application Serial No. PCT/US2010/033062, Written Opinion mailed Sep. 8, 2010", 5 pgs.

"U.S. Appl. No. 12/703,727, Response filed Jul. 23, 2012 to Final Office Action mailed May 23, 2012", 6 pgs.

"U.S. Appl. No. 12/703,727, Advisory Action mailed Aug. 8, 2012", 2 pgs.

* cited by examiner

QUALITY CONTROL PROCESS FOR UMG-SI FEEDSTOCK

CROSS-REFERENCE TO RELATED APPLICATIONS

This application claims priority to and is a continuation in part of pending U.S. patent application Ser. No. 12/703,727 "PROCESS CONTROL FOR UMG-Si MATERIAL PURIFICATION" by Kamel Ounadjela and filed on Feb. 10, 2010, which is incorporated herein by reference in its entirety and made part of the present U.S. Utility patent application for all purposes.

This application claims the benefit of provisional patent application 61/173,853 filed on Apr. 29, 2009, which is hereby incorporated by reference in its entirety.

FIELD

This invention relates in general to the field of silicon processing, and more specifically to the purification of upgraded metallurgical-grade silicon.

BACKGROUND OF THE INVENTION

The photovoltaic industry (PV) industry is growing rapidly and is responsible for an increasing amount of silicon being consumed beyond the more traditional uses as integrated circuit (IC) applications. Today, the silicon needs of the solar cell industry are starting to compete with the silicon needs of the IC industry. With present manufacturing technologies, both integrated circuit (IC) and solar cell industries require a refined, purified, silicon feedstock as a starting material.

Materials alternatives for solar cells range from single-crystal, electronic-grade (EG) silicon to relatively dirty, metallurgical-grade (MG) silicon. EG silicon yields solar cells having efficiencies close to the theoretical limit, but at a prohibitive price. On the other hand, MG silicon typically fails to produce working solar cells. Early solar cells using polycrystalline silicon achieved very low efficiencies of approximately 6%. In this context, efficiency is a measure of the fraction of the energy incident upon the cell to that collected and converted into electric current. However, there may be other semiconductor materials that could be useful for solar cell fabrication. In practice, however, nearly 90% of commercial solar cells are made of crystalline silicon.

Cells commercially available today at 24% efficiencies are made possible by higher purity materials and improved processing techniques. These engineering advances have helped the industry approach the theoretical limit for single junction silicon solar cell efficiencies of 31%.

Because of the high cost and complex processing requirements of obtaining and using highly pure silicon feedstock and the competing demand from the IC industry, silicon needs usable for solar cells are not likely to be satisfied by either EG, MG, or other silicon producers using known processing techniques. As long as this unsatisfactory situation persists, economical solar cells for large-scale electrical energy production may not be attainable.

Several factors determine the quality of raw silicon material that may be useful for solar cell fabrication. Silicon feedstock quality often fluctuates depending on the amount of impurities present in the material. The main elements to be controlled and removed to improve silicon feedstock quality are boron (B), phosphorous (P), and aluminum (Al) because they significantly affect the resistivity of the silicon. Feedstock silicon materials based on upgraded metallurgical (UM) silicon very often contain similar amounts of boron and phosphorous. And while chemical analysis may be used to determine the concentrations of certain elements, this approach requires too small of a sample size (a few grams) and often provides variable results—for example, the amount of boron present may vary from 0.5 parts per million by weight (ppmw) to 1 ppmw. Further, chemical analysis on different batches have provided consistent boron and phosphorous concentrations but with extreme variation in electrical parameters. These unreliable results may be due to the large affects relatively minor impurities produce.

Resistivity is one of the most important properties of silicon (Si) used for manufacturing solar cells. This is because solar cell efficiency sensitively depends on the resistivity. State-of-the-art solar cell technologies typically require resistivity values ranging between 0.5 $\Omega$·cm and 5.0 $\Omega$·cm. Currently produced feedstock materials based on UM silicon often come with a base resistivity below the minimum resistivity of 0.5 $\Omega$·cm that is typically specified by solar cell manufacturers. There is a simple reason for this: Expensive processes for upgrading UM-Si are primarily concerned with taking out non-metals, including dopant atoms B and P. In order to reduce cost, there is a clear tendency to minimize such processing, i.e., UM-Si typically still contains high concentrations of dopant atoms.

Purification by segregation during directional solidification is often used in the process to obtain upgraded metallurgical silicon. Impurity removal methods include directional solidification which concentrates impurities such as B, P, Al, C, and transition metals in the last part of the resulting silicon ingot to crystallize—often the top of the ingot. In a perfect case, the crystallization during the directional solidification process would be uniform from top to bottom and the solid-liquid interface would be planar throughout the entire ingot. This would result in consistent impurity concentrations profiles from top to bottom throughout the ingot—allowing impurities in the ingot to be removed according to one flat cut across the ingot which removes top part of the ingot.

However, controlling the thermal field during a directional solidification process is difficult and often results in an inhomogeneous growth of the crystals in the silicon ingot. This causes uneven top to bottom impurity concentration profiles throughout the ingot (i.e. from one end of the ingot to another). This effect is further amplified in mass production of large amounts of silicon. Because different areas of the ingot have different impurity profiles, and thus different resistivity profiles, a flat cut across the ingot does not maximize the usable silicon yield while still removing most of the concentrated impurities.

Further, variability in incoming UMG-Si feedstock quality necessitates control process for testing and analyzing UMG-Si material quality. Typically, elements such as boron (B) and phosphorous (P) can degrade Si feedstock quality. If not controlled within certain concentration limits they produce sizable variations in ingot resistivity. Other elements such as, but not limited to, carbon, oxygen, nitrogen, compounds having these elements, in particular SiC, may also degrade ingot quality.

Due to the large effects of these and similar impurities, feedstock materials should be analyzed and tested to ensure proper quality. Batch to batch variations in the impurities and resistivity of incoming feedstock affect bottom to top resistivity of ingots and yield (n-type part vs. p-type part).

Suppliers of UMG-Si feedstock may not rigorously establish quality control of the materials they ship to their customers. Often, typical chemical analyzes produces unreliable results because of the large effects relatively minor impurities produce. Further, suppliers often test too small a sample size in relation to the variability of boron and phosphorous concentrations in the feedstock batch. Additionally, superimposed measurement error makes measurement results uncertain. One indication of these measurement errors occurs when chemical analysis on different batches yields the same boron and phosphorous content despite variation in electrical parameters. For companies relying on a plurality of UMG-Si feedstock batches to cast silicon ingots, these variations among batches may not be acceptable.

SUMMARY

Therefore a need has arisen for a quality control process for UMG-Si feedstock material which provides reliable impurity data/measurements. The method must be accurate and provide impurity data for a feedstock batch from a sample test ingot. A further need exists to more accurately identify impurity concentration profiles in a UMG-Si feedstock material batch so that providers may more reliably produce UMG-Si meeting desired impurity concentration thresholds and solar cells manufacturers may improve silicon wafer yield.

A further need exists for a simple process that determines impurity concentrations for UMG-based multi-crystalline silicon material resulting in a material with good ingot yield and improved mechanical and electrical properties, the latter in regard to solar cell quality. Such a process should be easily transferable to higher-grade, non-UMG feedstock silicon which is used partially or exclusively for crystallizing mono-crystalline silicon materials, for example by applying the CZ technique or the FZ technique.

In accordance with the disclosed subject matter, a method for determining the concentrations of boron and phosphorous in a batch UMG-Si feedstock is provided that substantially eliminates or reduces disadvantages and problems associated with previously developed UMG-Si impurity concentration determination methods.

The present disclosure provides a method for determining the concentrations of boron and phosphorous in a batch UMG-Si feedstock. A silicon test ingot is formed by the directional solidification of molten UMG-Si from a UMG-Si feedstock batch. The resistivity of the silicon test ingot is measured from top to bottom. Then, the resistivity profile of the silicon test ingot is mapped. From the resistivity profile of the silicon test ingot, the concentrations of boron and phosphorous of the UMG-Si silicon feedstock batch are calculated.

According to one aspect of the disclosed subject matter, a plurality of silicon test ingots are grown simultaneously from different batches of UMG-Si feedstock.

Technical advantages of the present disclosure include more accurate data on silicon impurity concentrations which allows for obtaining higher usable silicon yield, UMG-Si process control improvements, and UMG-Si manufacturing efficiency and cost improvements. A further technical advantage of calculating the impurity concentrations of the UMG-Si feedstock batch based on the test ingot's resistivity profile includes more consistent and accurate impurity concentration measurements.

The disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGS. and detailed description. It is intended that all such additional systems, methods, features and advantages included within this description, be within the scope of the accompanying claims.

BRIEF DESCRIPTIONS OF THE DRAWINGS

For a more complete understanding of the disclosed subject matter and advantages thereof, reference is now made to the following description taken in conjunction with the accompanying drawings in which like reference numerals indicate like features and wherein.

Figure 19:
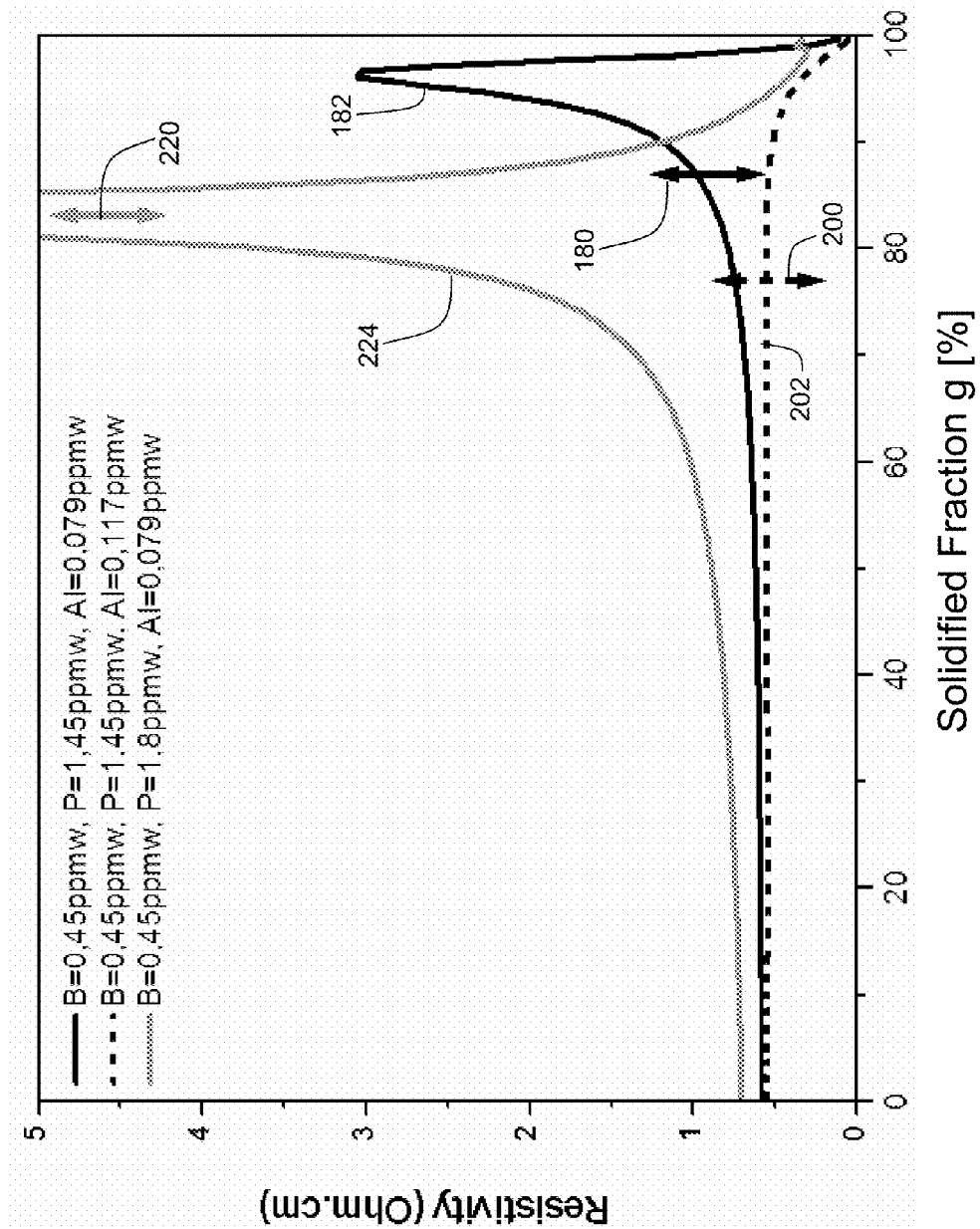
FIG. 19 is a graph showing the resistivity profiles (in ohm-cm over solidification fraction) of the silicon ingots in FIGS. 16-18.
Figure 20:
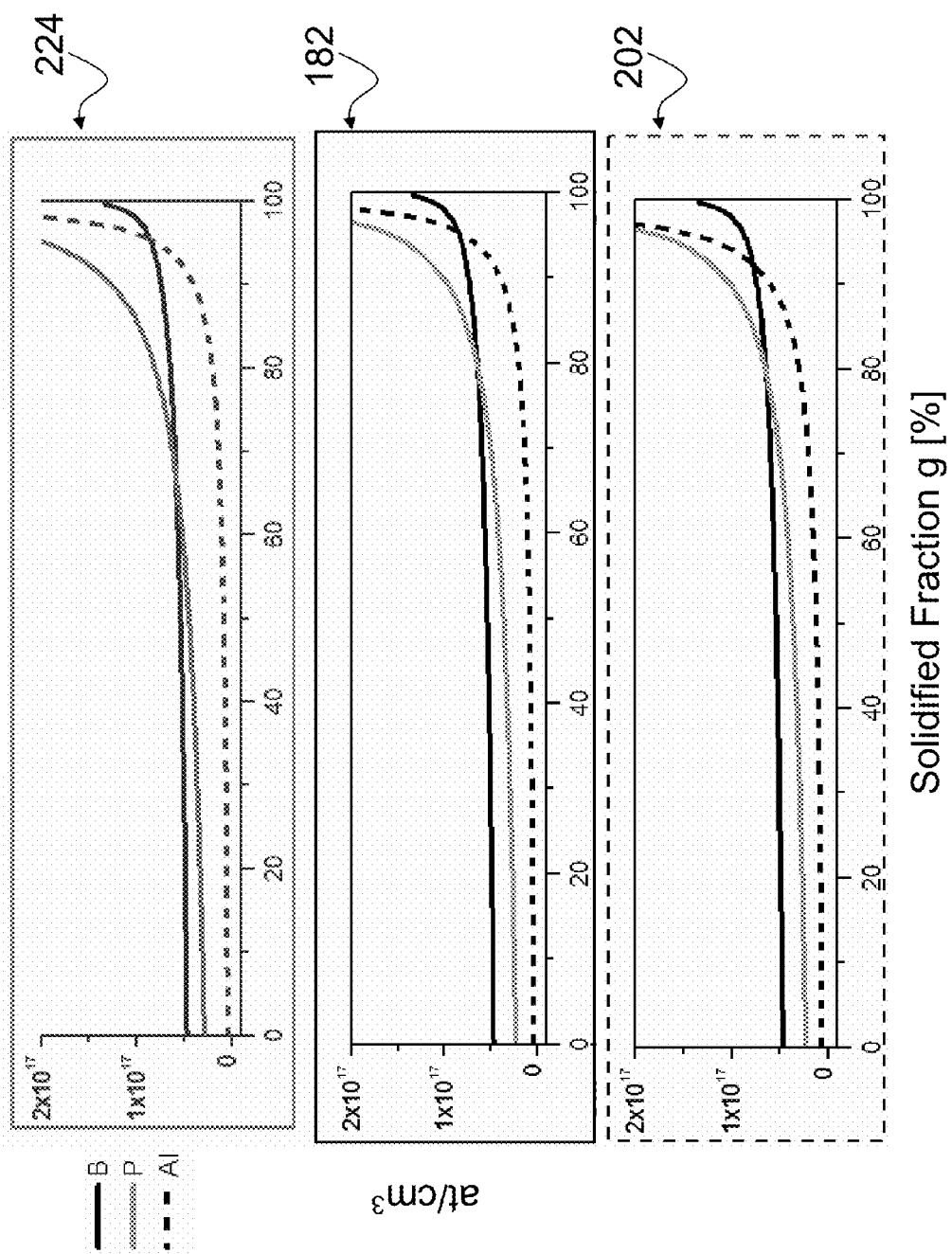
Figure 21:
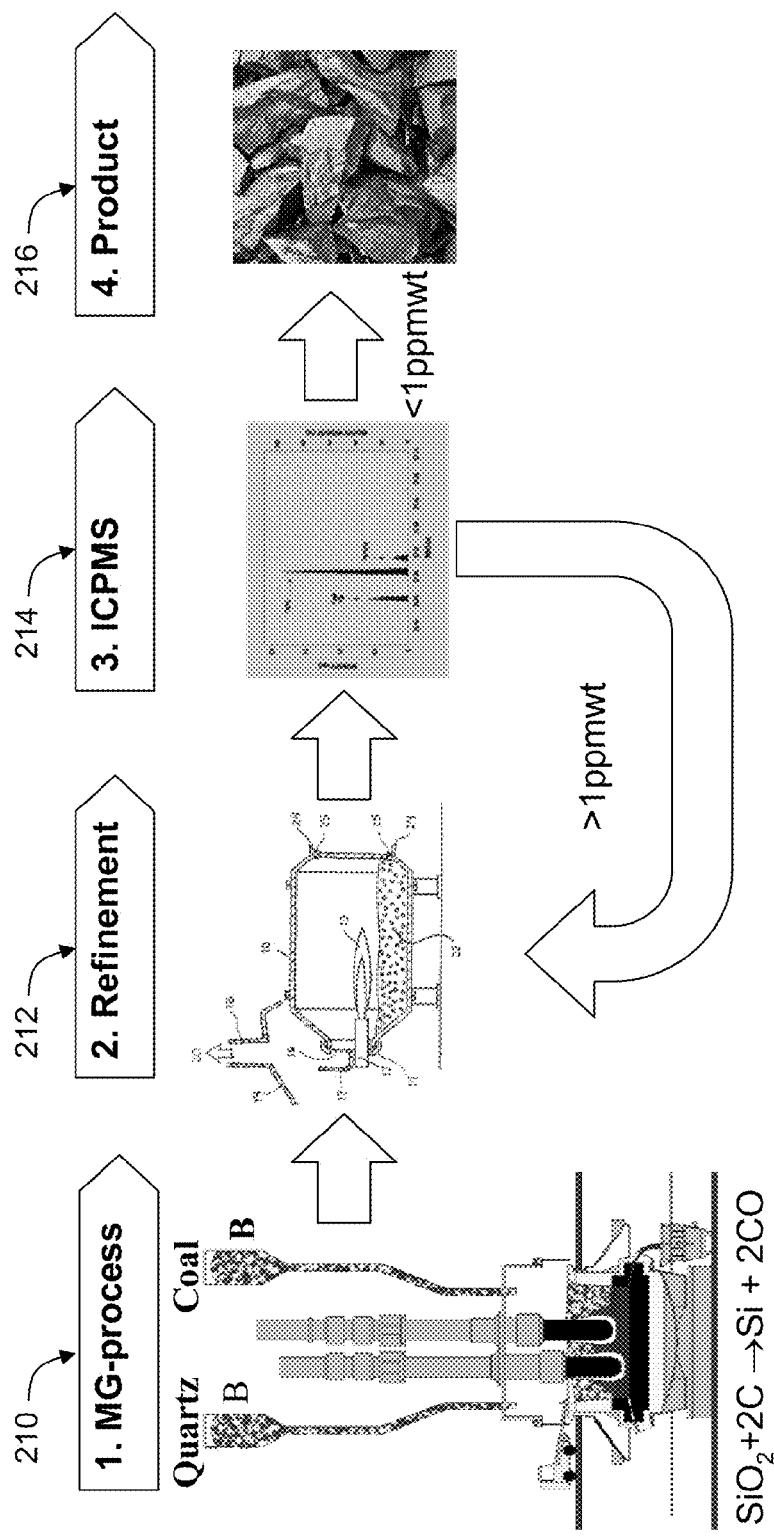
Figures 22, 23:
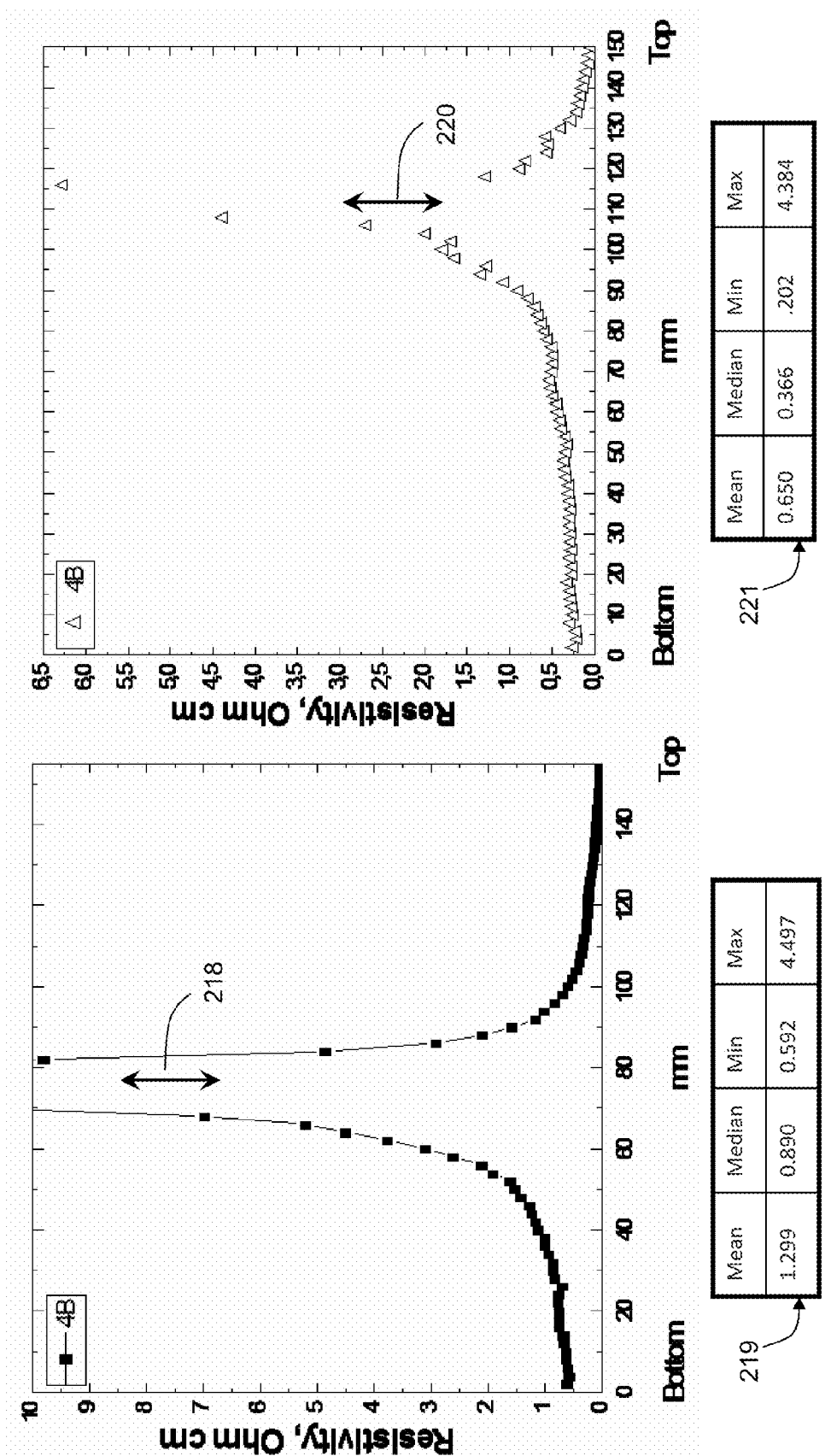
Figure 24:
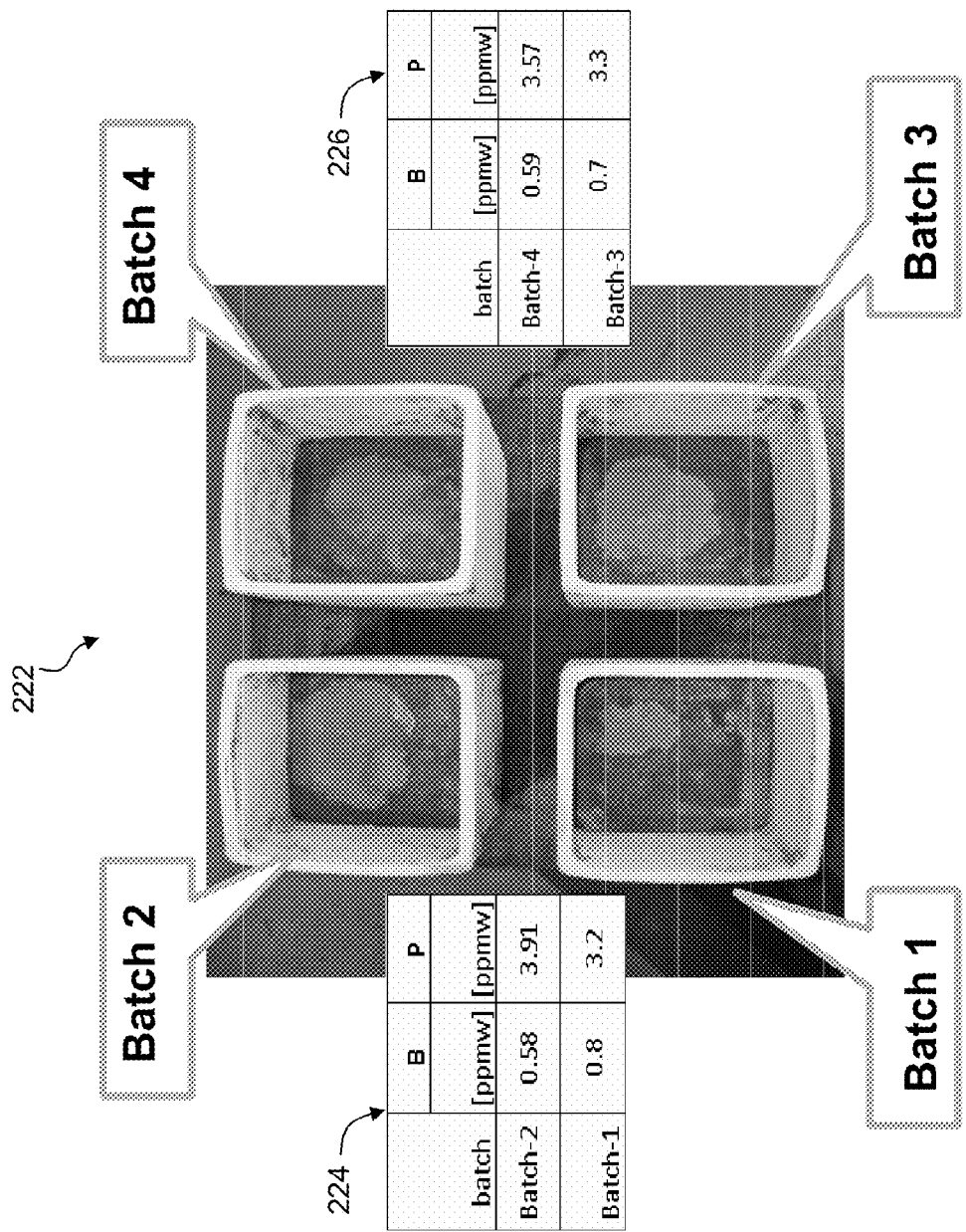
Figures 25, 26:
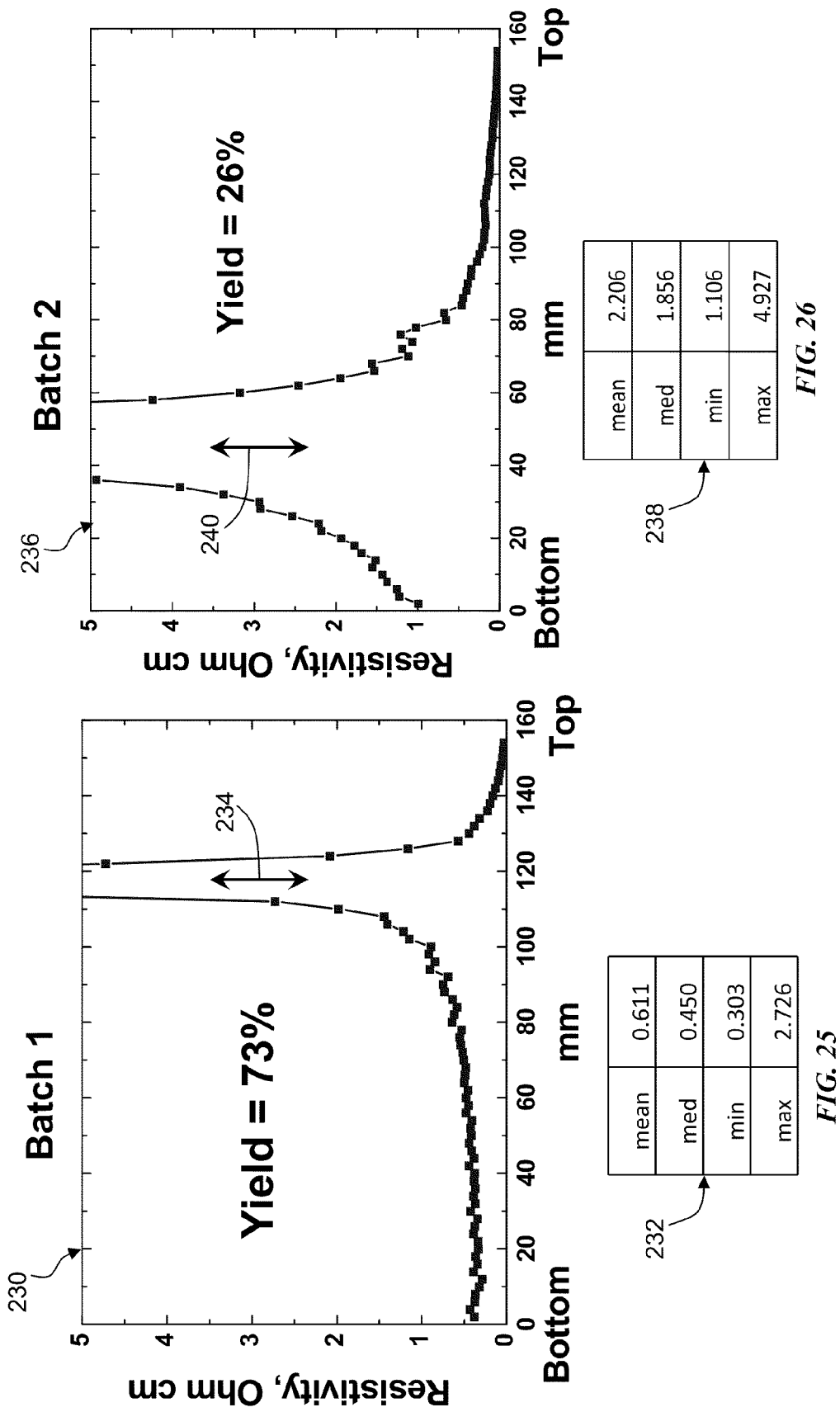
Figure 28:
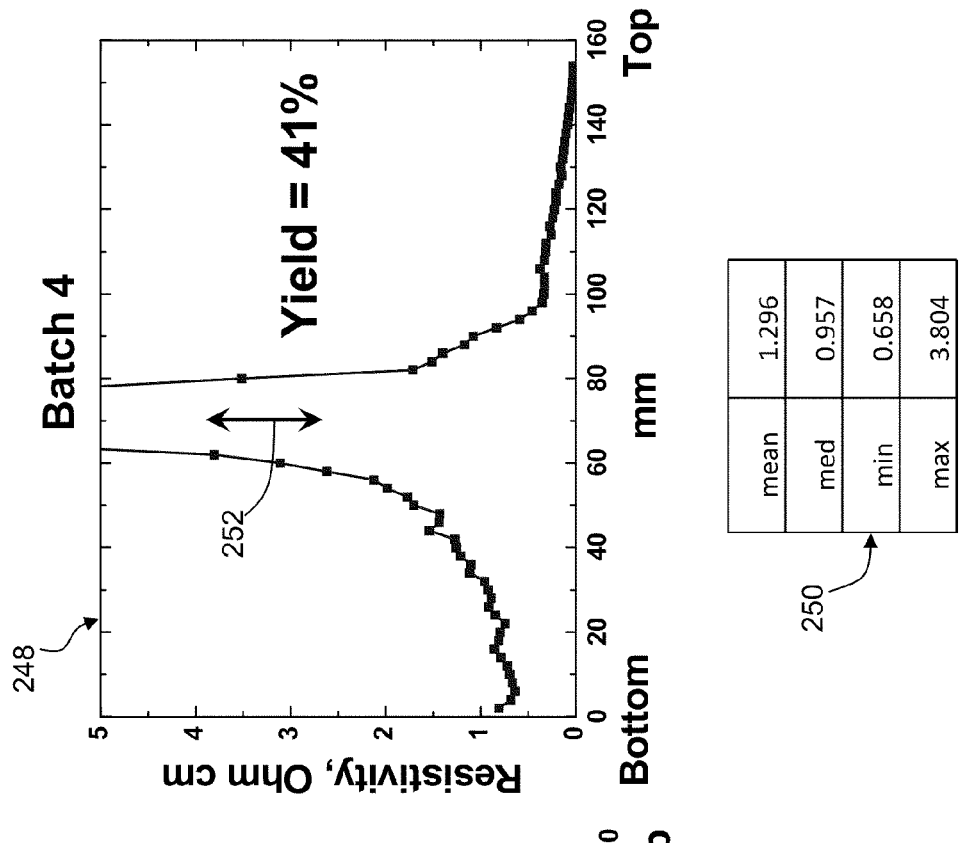
Figure 27:
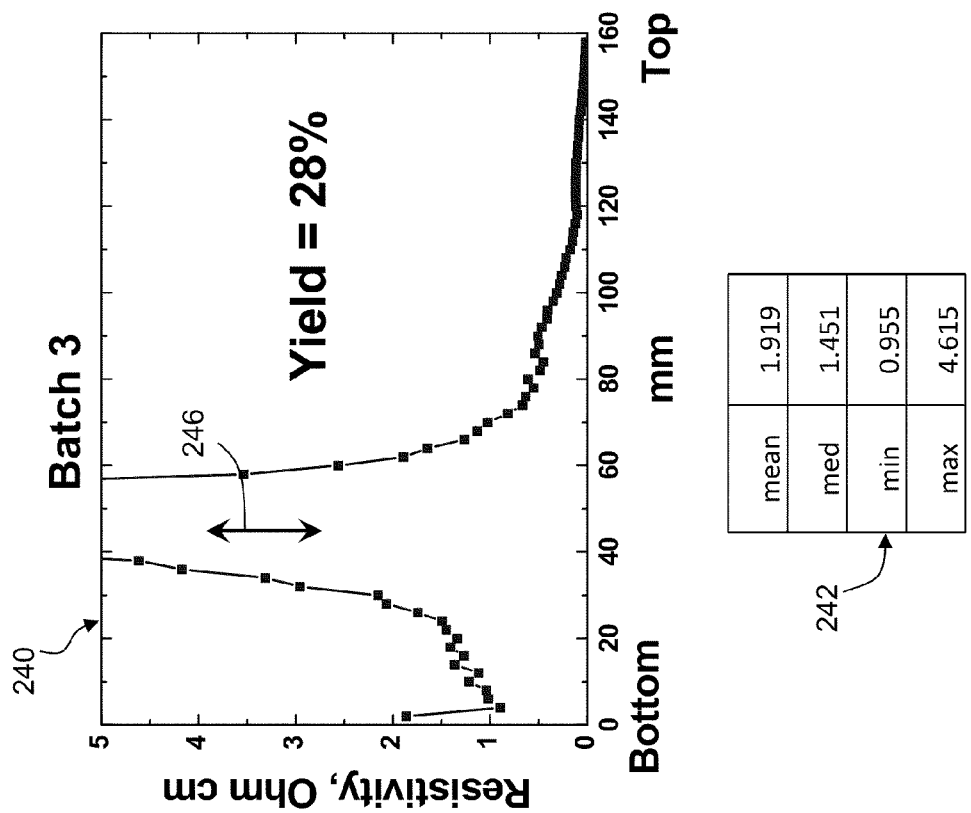
Figure 29:
Figure 30:
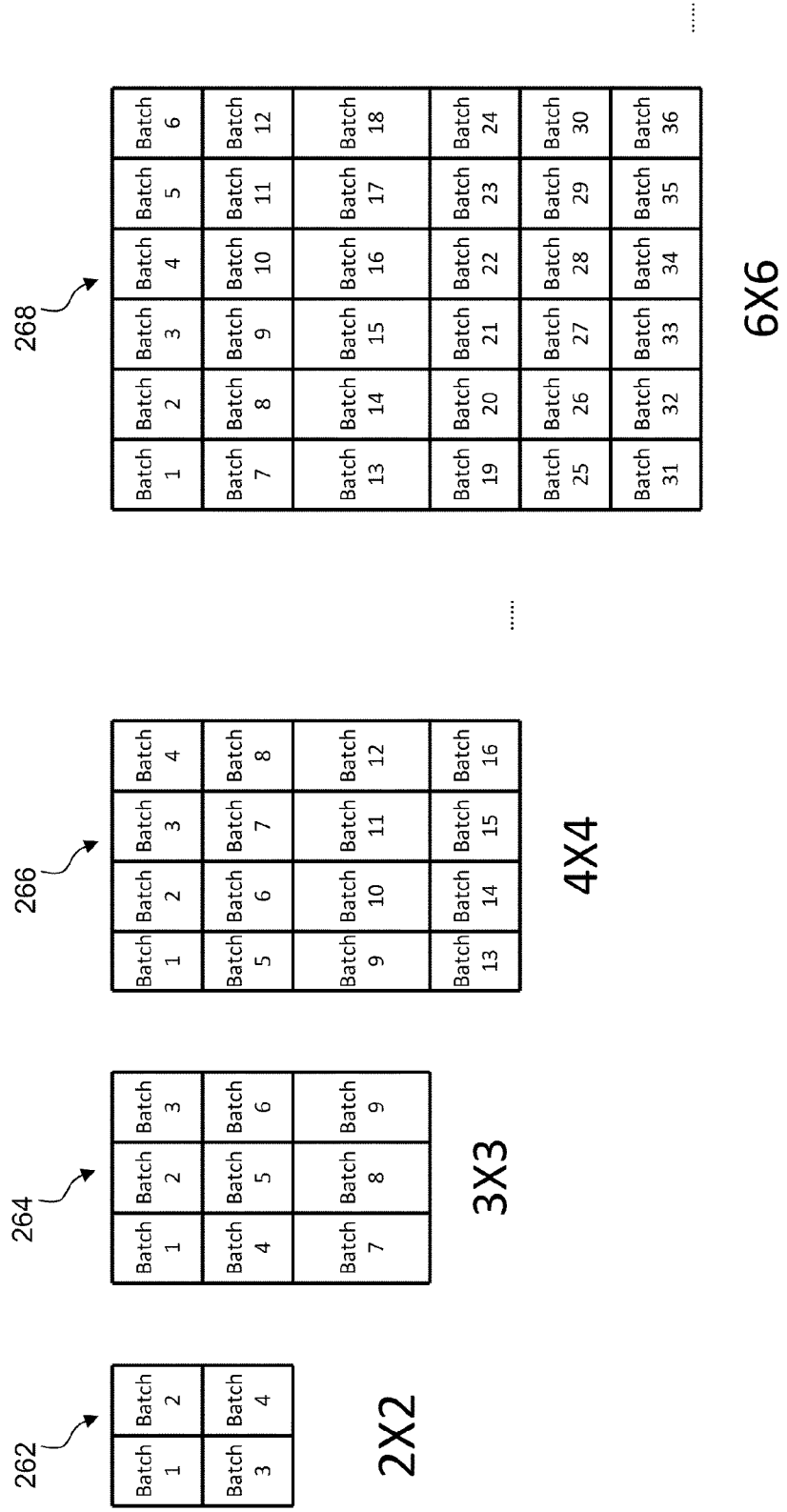
Figure 31:
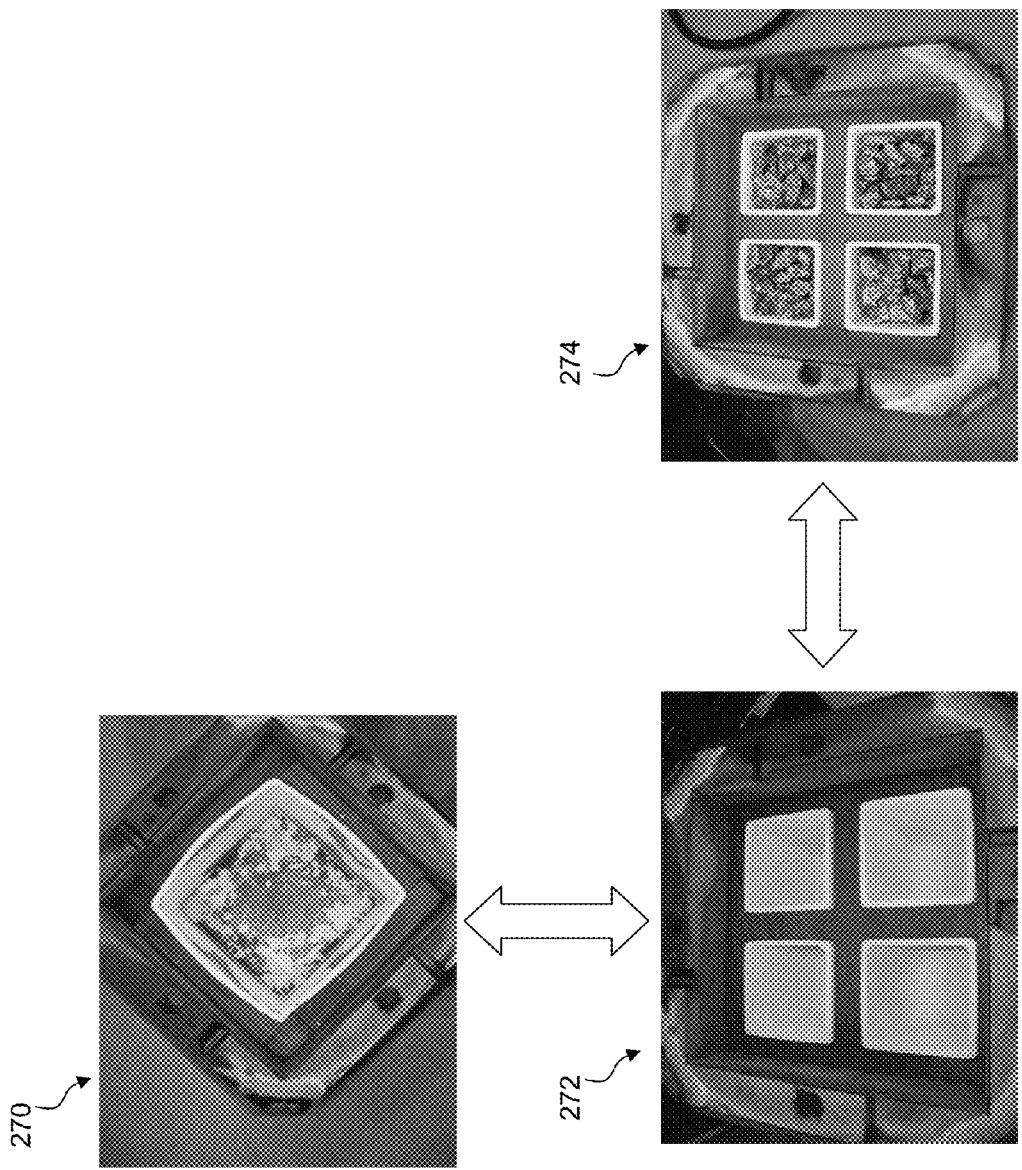
Figure 32:
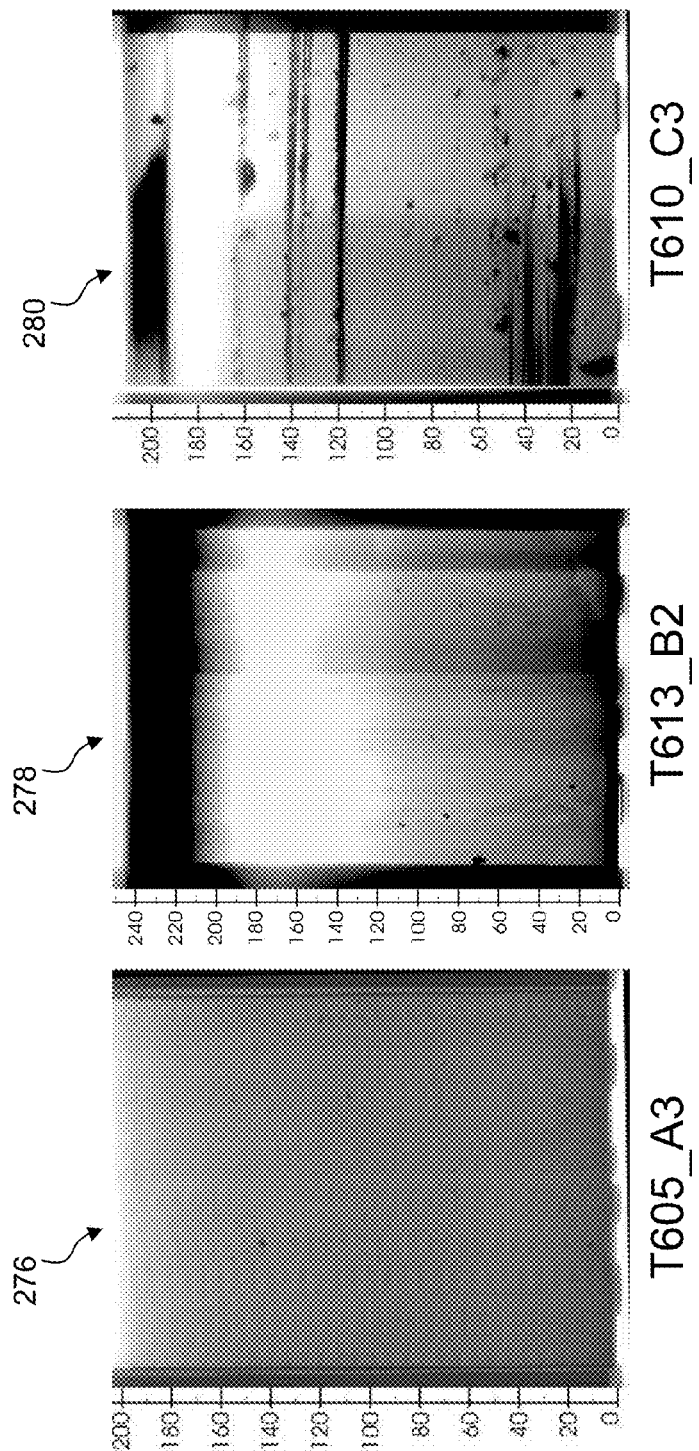
Figure 33:
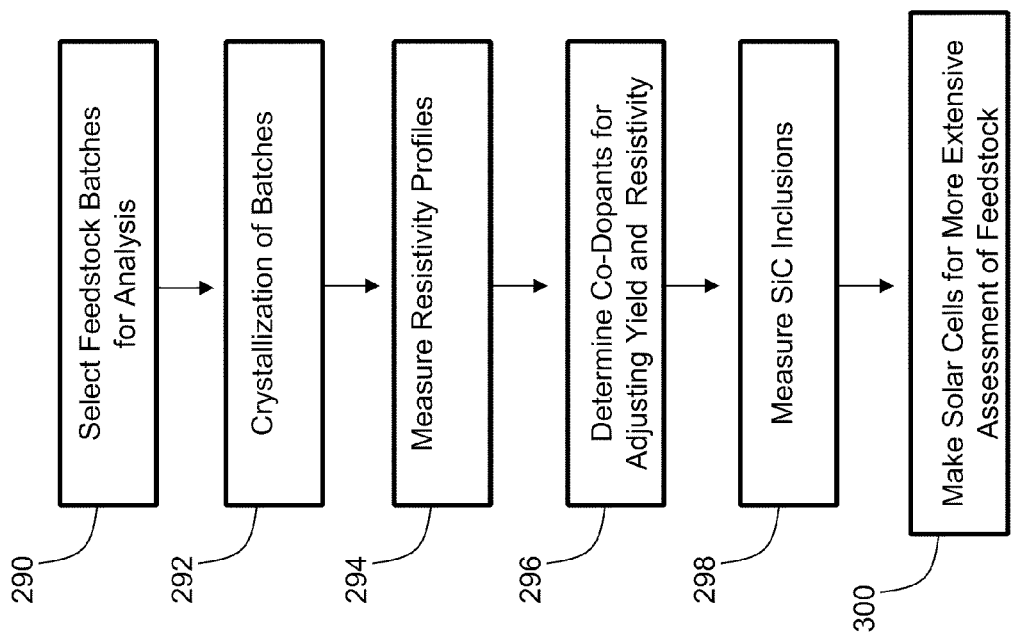

FIG. 20 presents the corresponding impurity concentration profiles for the resistivity profiles in FIG. 19;

FIG. 21 is a graphic depiction showing a prior art process flow for reducing boron, phosphorous, and aluminum;

FIGS. 22 and 23 are graphs showing actual measured resistivity of various batches of UMG-Si feedstock;

FIG. 24 displays the ICPMS data of B and P for exemplary test ingots of a simultaneous directional solidification run;

FIG. 25 is a graph showing the measured resistivity data for Batch 1 in FIG. 24;

FIG. 26 is a graph showing the measured resistivity data for Batch 2 in FIG. 24;

FIG. 27 is a graph showing the measured resistivity data for Batch 3 in FIG. 24;

FIG. 28 is a graph showing the measured resistivity data for Batch 4 in FIG. 24;

FIG. 29 is a photograph of a casted ingot;

FIG. 30 pictorially depicts embodiments of crystal grower crucible configurations in accordance with the disclosed subject matter;

FIG. 31 is a photographic representation showing a modification a single crucible thermal configuration to four (4) crucibles per run thermal configuration;

FIG. 32 is a photographic example showing impurities found in actual UMG-Si ingots; and FIG. 33 is a process flow showing major steps of one embodiment of the disclosed UMG-Si control process.

DETAILED DESCRIPTION OF THE SPECIFIC EMBODIMENTS

The following description is not to be taken in a limiting sense, but is made for the purpose of describing the general principles of the present disclosure. The scope of the present disclosure should be determined with reference to the claims. And although described with reference to the purification of aluminum-rich UMG silicon, a person skilled in the art could apply the principles discussed herein to any upgraded metallurgical-grade material.

Preferred embodiments of the disclosed subject matter are illustrated in the FIGUREs, like numerals being used to refer to like and corresponding parts of the various drawings.

Figure 1:
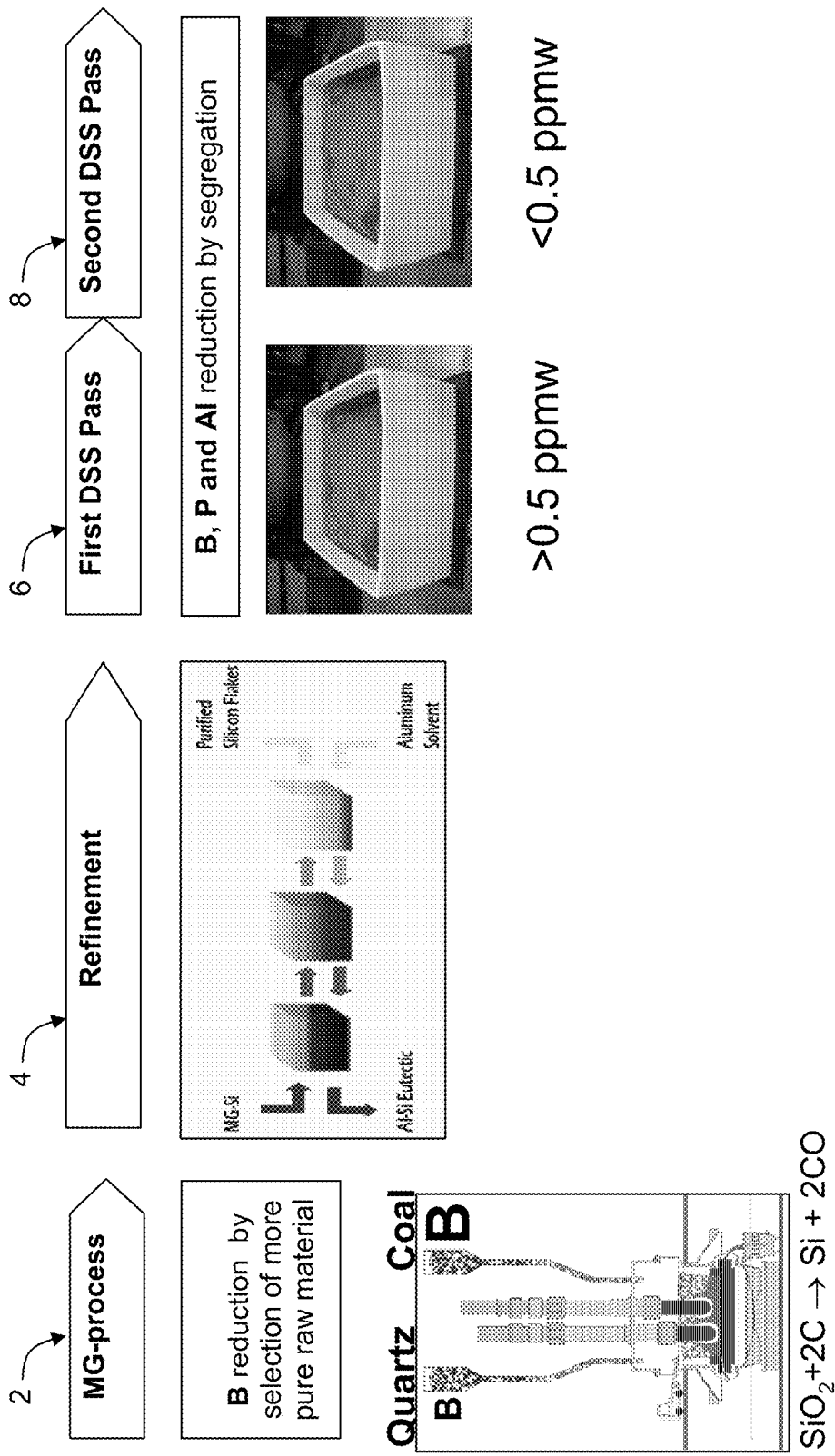
FIG. 1 (Prior Art) is a process flow for reducing boron, phosphorous, and aluminum content in silicon.

FIG. 1 shows a prior art process flow for reducing boron, phosphorous, and aluminum content in silicon. In step 2, pure raw materials, such as quartz and coal, are selected to produce MG-Si with low boron content. Step 4 then reduces the aluminum content further through MG-Si refinement. Additionally, boron content could be reduced further, for example in a furnace with an oxygen fuel burner—leading ultimately to UMG-Si. Then to further reduce impurities such as boron, phosphorous, and aluminum, the UMG-Si is often processed through directional solidification systems until the silicon feedstock is ready to be released, typically when the boron concentration has been reduced to less than a specified threshold concentration. In both First DSS Pass 6 and Second DSS Pass 8, the part of the ingot having the highest concentration of impurities is cut off (usually the top part) yielding purer silicon. First DSS Pass 8 may yield silicon having impurities of, for example, greater than the required 0.5 parts per million by weight and Second DSS Pass 10 may yield silicon having impurities less than the required 0.5 parts per million by weight.

More effective impurity controls are necessary to provide purer silicon while minimizing waste. Resistivity measurements on the silicon ingot after first DSS Pass 8 and before cropping to remove impurities would substantially improve the silicon yield. Likewise, resistivity measurements on the silicon ingot after second DSS Pass 10 and before second cropping to remove impurities would substantially improve the silicon yield of the final silicon product.

Figure 2:
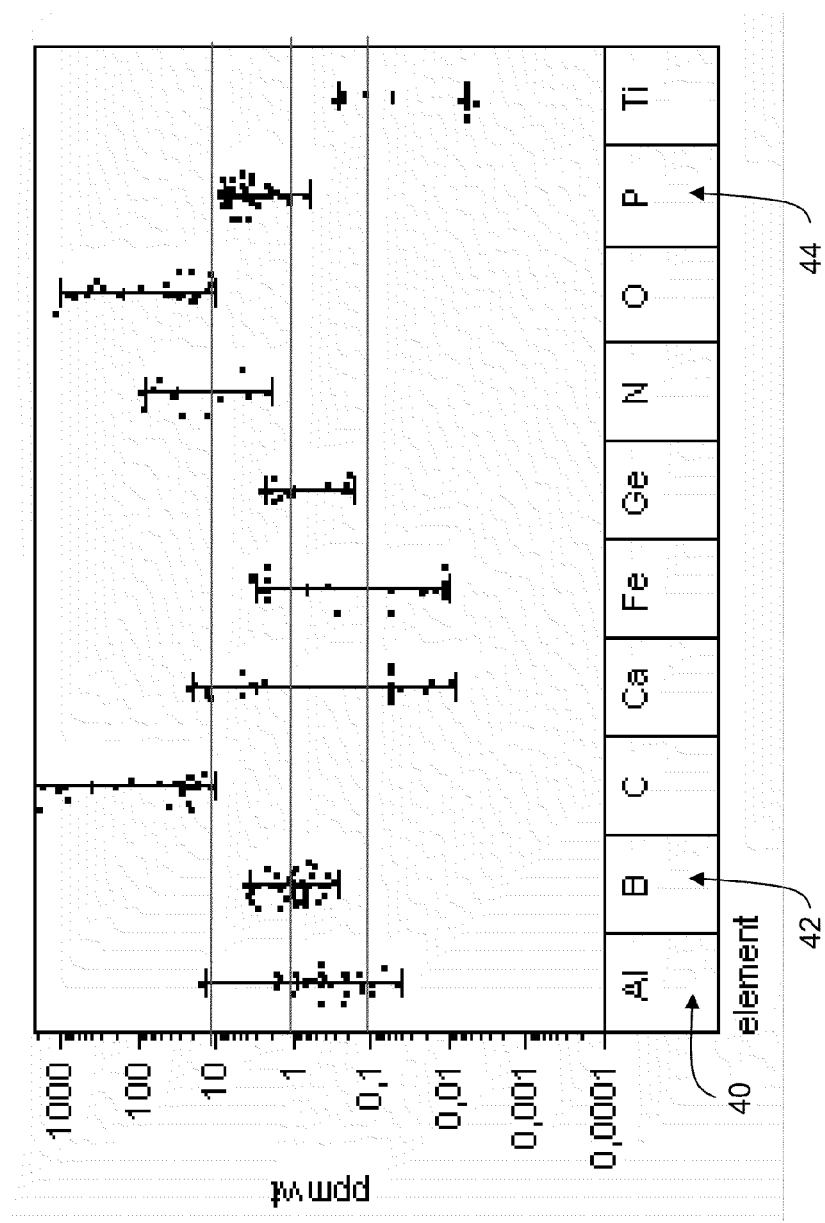
FIG. 2 is graph showing actual measured impurities of various batches of UMG feedstock.

FIG. 2 is graph showing actual measured concentrations in parts per million by weight of selected elements in various batches of UMG feedstock. Note the large variance in the concentrations of the elements across different batches of feedstock. This variability is mainly caused by source materials, such as quartz and coal, of UMG-Si feedstock. Small variations in impurity concentration can significantly affect the variability from batch to batch of the bottom to top resistivity of the ingot as well as the ingot yield (n-part vs. p-part). Aluminum 40, boron 42, and phosphorous 44 are the main elements to be controlled as they significantly affect the resistivity of the material.

Figure 3:
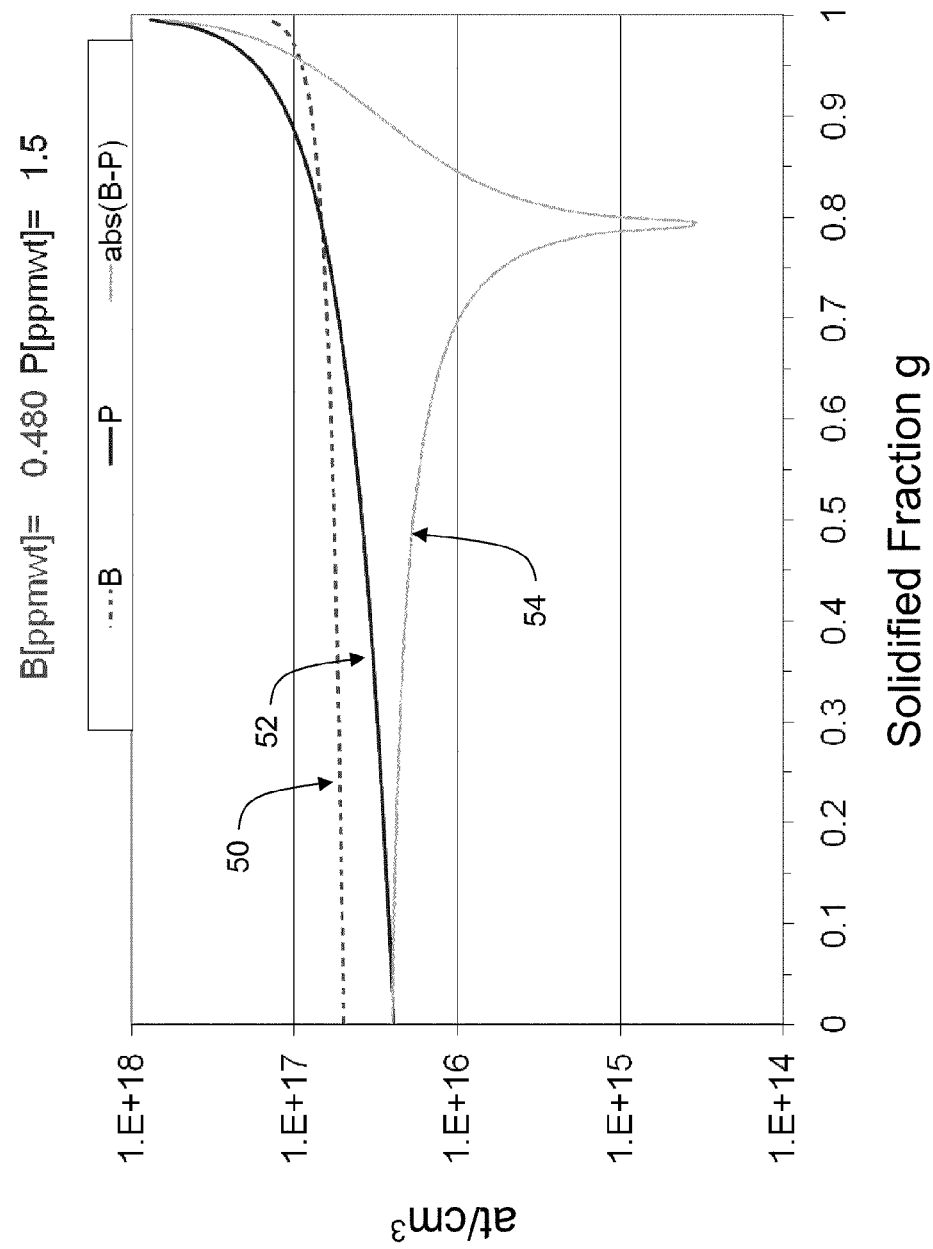
FIG. 3 is a graph showing the concentration profile of impurities boron and phosphorous in a UMG-Si ingot.

FIG. 3 is a graph showing the concentration profile of dopants boron 50 and phosphorous 52 (in atoms per centimeter cubed over solidified fraction) in a UMG-Si ingot. In FIG. 3, the initial concentration of boron 50 is 0.48 parts per million by weight and the initial concentration of phosphorous 52 is 1.5 parts per million by weight. The variation of the concentrations of boron and phosphorous along the solidified fraction (or ingot height) reflects uneven segregation during directional solidification caused by element-specific segregation behavior. The uneven segregation of boron and phosphorous in the ingot causes a change of the conductivity type—from p-type (boron, aluminum) to n-type (phosphorous)—at around 80% ingot height. This change in conductivity type is shown by B/P ratio 54 (shown as the absolute value of the difference B-P on FIG. 3). The B/P ratio, such as B/P ratio 54, thus limits the yield of p-type material. In case of UMG feedstock material with a relatively high aluminum concentration, aluminum can also impact the yield by shifting respective resistivity profiles.

Figure 4:
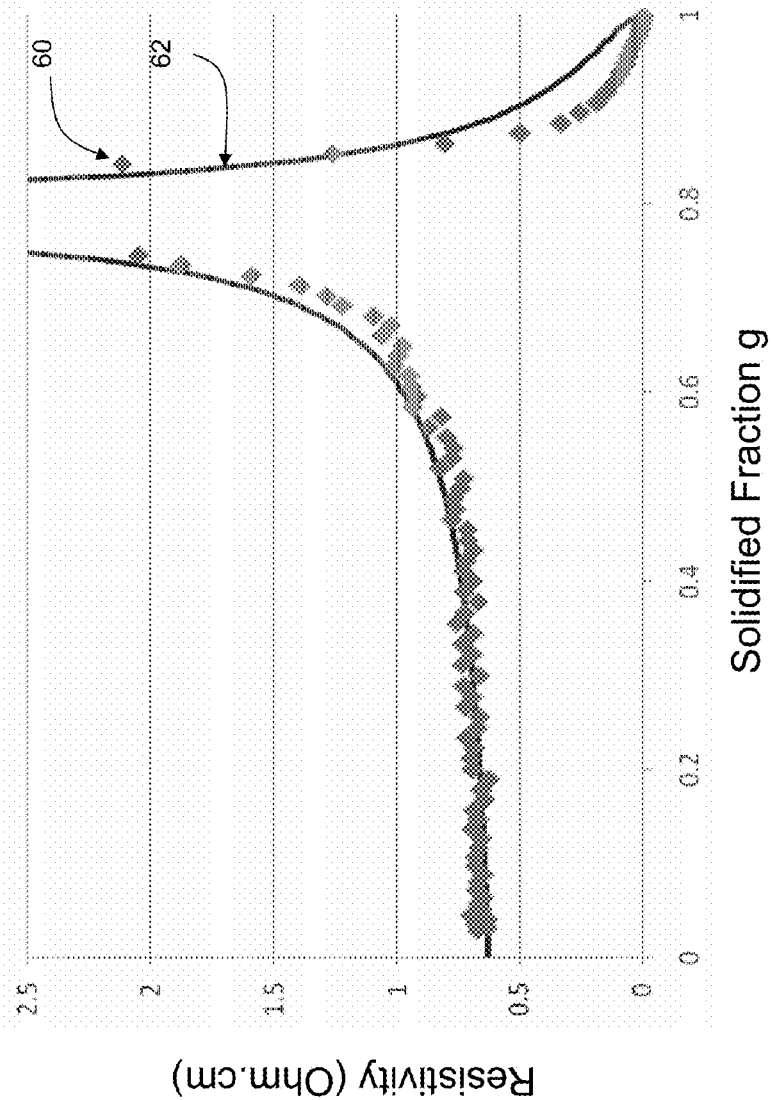
FIG. 4 is a graph showing the resistivity profile (calculated vs. measured resistivity) of the UMG-Si ingot measured in FIG. 3.

FIG. 4 is a graph showing the resistivity profile (calculated resistivity 62 and measured resistivity 60) of the UMG-Si ingot presented in FIG. 3. The resistivity is measured in ohm-centimeters and the ingot height is measured as a bottom to top percentage (translating into the solidified fraction g). The resistivity is determined from the net-doping of the material which is the absolute difference in the concentrations of boron and phosphorous (shown as abs(B-P) 54 in FIG. 3). Note that the resistivity profile reflects the change in conductivity type caused by the segregation characteristics of boron and phosphorous in the ingot at around 80% ingot height as in FIG. 3.

Figure 5:
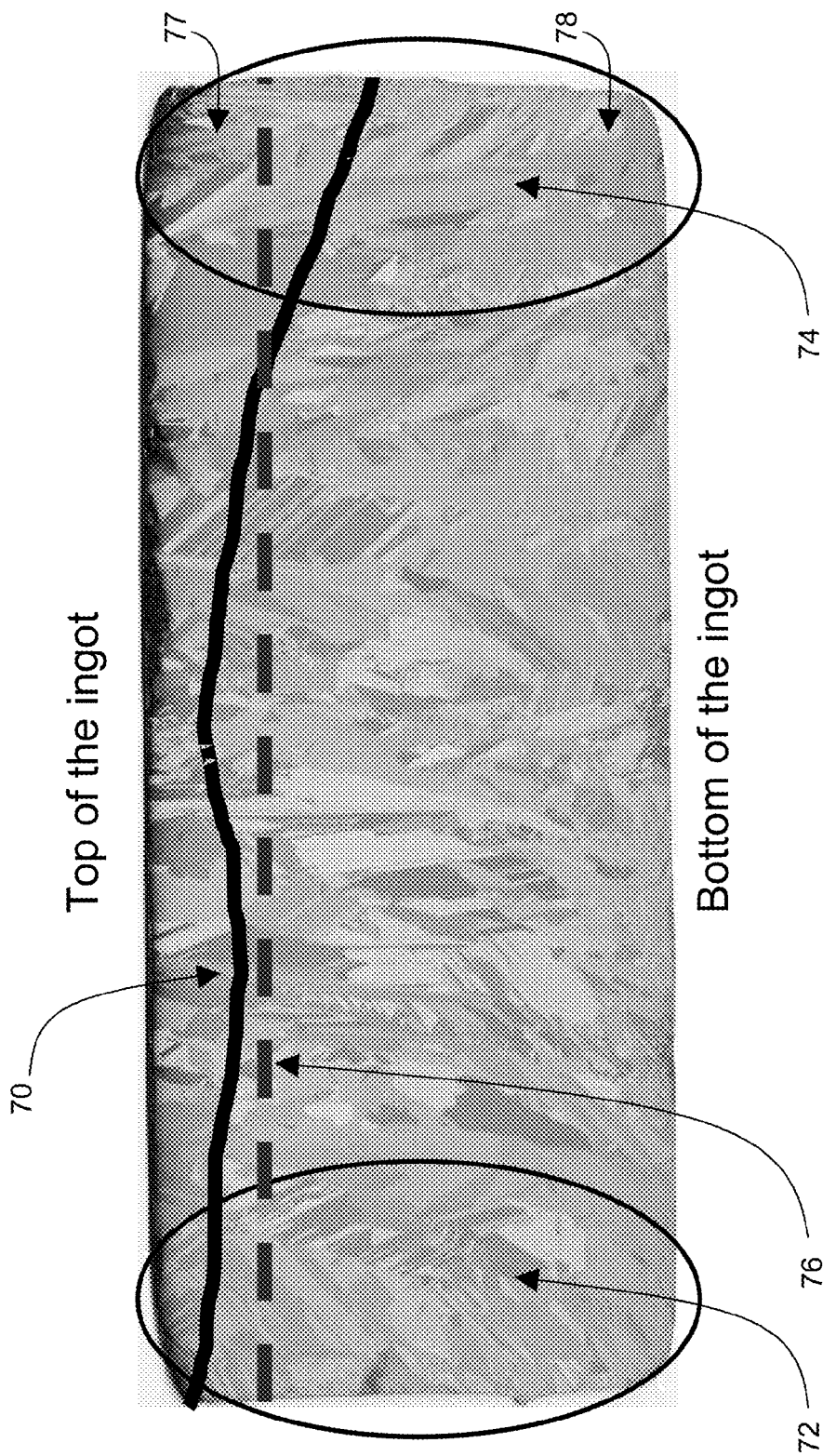
FIG. 5 shows a cross-sectional image of a UMG-Si ingot after directional solidification.

FIG. 5 shows a cross-sectional image of a UMG-Si ingot after directional solidification. Impurity line 70 mirrors the measured change in conductivity type in a typical ingot based on Al-rich UMG-Si feedstock. In this cross sectional image of the ingot, a strong variation of the ingot yield line may be observed (as shown by impurity line 70)—indicating an ingot yield close to 90% on left ingot side 72 and an ingot yield close to 60% on right ingot side 74. The heavy yield variation across the ingot reflects inhomogeneous thermal conditions across the ingot during solidification, leading to inhomogeneous segregation conditions for the dopant elements B, P and Al.

Directional solidification typically concentrates impurities at the top of the ingot—and the top layer having the most impurities is then removed leaving the purer bottom layer for further processing. As shown in FIG. 5, layer 78 has fewer impurities than layer 77. However, UMG-Si ingots rarely have a flat, planar impurity profiles after directional solidification. Flat cropping line 76 shows a flat cutoff line that would be typically used to remove impurities concentrated in the top of the ingot. However, a flat cut does not take advantage of the uneven and non-uniform distribution of the impurities in the material (shown by impurity line 70), thus leading to inefficient and wasteful UMG-Si processing.

Figure 6:
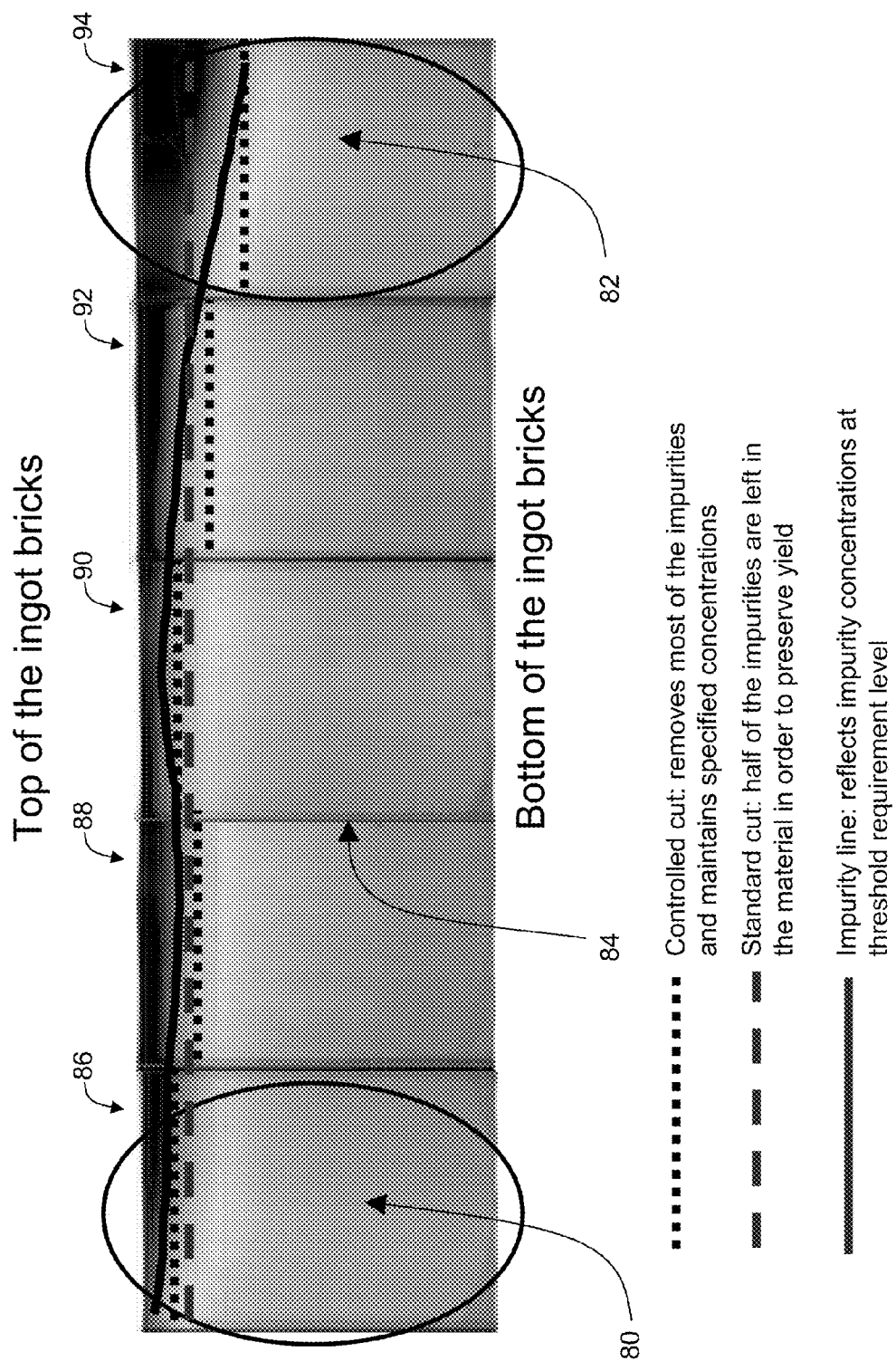
FIG. 6 is a cross-sectional image of a UMG-Si ingot after directional solidification with cropping lines created in accordance with the disclosed subject matter.

FIG. 6 shows a cross-sectional image of a UMG-Si ingot after directional solidification with cropping lines created in accordance with the disclosed subject matter. Impurities such as boron, phosphorous, and aluminum are doping active in the silicon and affect resistivities of the ingot bricks. Resistivity measurements provide an accurate determination of where to remove the contaminated part of the ingot in order to decrease the absolute concentration of dopants and metallic impurities in the ingot as a whole.

The lowest concentration of impurities is found in cool zone 80 (the first area to solidify). The highest concentration of impurities is found in hot zone 82 (the last area to solidify). The segregation of impurities is concentrated in the last part of the ingot to be solidified from the melting state during directional solidification. This causes the impurity profiles to be different from region to region in the ingot. Note the different impurity levels in ingot brick 86 and ingot brick 94. The ingot has been cut into bricks in order to control the impurity removal by customizing a crop line for each brick. Ingot bricks 86, 88, 90, 92, and 94 have been cut after directional solidification. Cut line 84 reflects the brick divisions on the image.

After the bricks have been cut, a resistivity profile of the ingot is created by measuring the resistivity of the ingot from bottom to top and mapping those calculations, on a graph or 3-D resistivity map. The resistivity measuring for the ingot may also take place before the ingot has been cut into bricks. Further, the brick size may be customized according to many factors including, but not limited to, the size of the silicon ingot, the impurity concentration of the silicon ingot, the size necessary for to obtain an accurate resistivity profile, and manufacturing efficiency requirements.

In FIG. 6, impurity line reflects the impurity concentrations in the ingot at threshold requirement levels. Standard cut shows a flat crop line that attempts to balance impurity removal with silicon material yield. Controlled cut shows a customized crop line for each brick based on that brick's resistivity profile. The controlled cut line defines the calculated cropping line for each individual brick based on that brick's resistivity profile—thus only those parts containing concentrated impurities are removed while preserving silicon material yield. This allows for the optimal removal of impurities without sacrificing usable silicon. The cut is calculated by measuring the resistivities from the top to bottom of each brick.

Without performing a controlled cut according to the disclosed process, a traditional standard cut can leave many impurities in the ingot, such as in the ingot region of brick 94, making it necessary to perform another directional solidification to further purify the material stemming from such an ingot.

Figure 7:
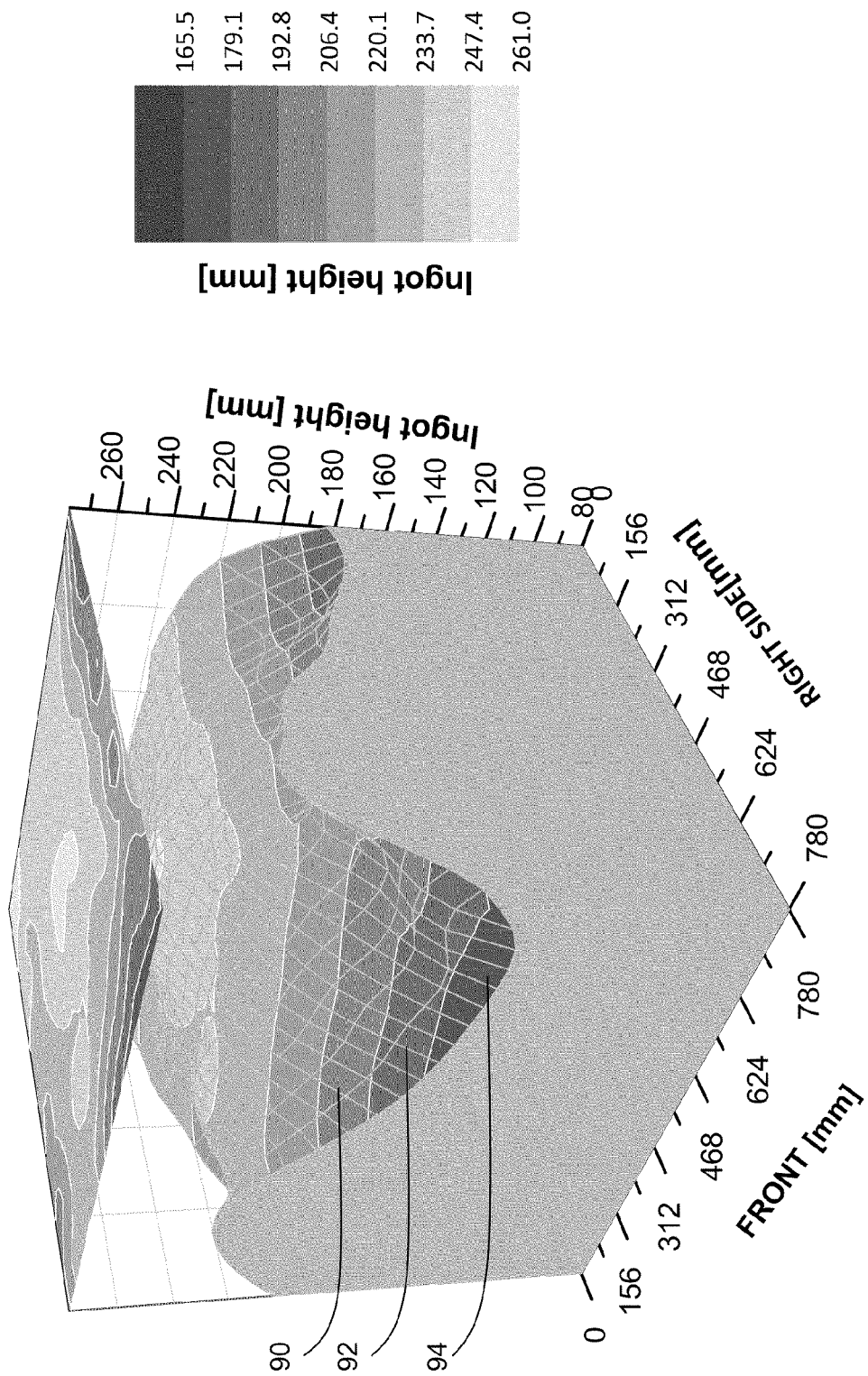
FIG. 7 is a graphical depiction of a 3-D solidification interface of a silicon ingot.

FIG. 7 is a graphical depiction of a 3-D solidification interface of a silicon ingot. Because it is difficult to control solidification, the solid-liquid interface during ingot crystallization is not planar and results in inhomogeneous segregation layers, as shown in FIG. 7. After directional solidification, the impurities are concentrated in the top of the ingot. However, solidification layers 90, 92, and 94 are significantly uneven—meaning, the solidification layers are not planar but rather vary vertically upward and downward in the ingot and have varying thicknesses throughout the ingot. This causes the impurity profiles from region to region in the ingot to be different, which results in an uneven silicon ingot impurity profile. The uneven solidification layers make it difficult to easily and efficiently remove the concentrated impurities without sacrificing high yield silicon or leaving too many impurities in the ingot.

Figure 8:
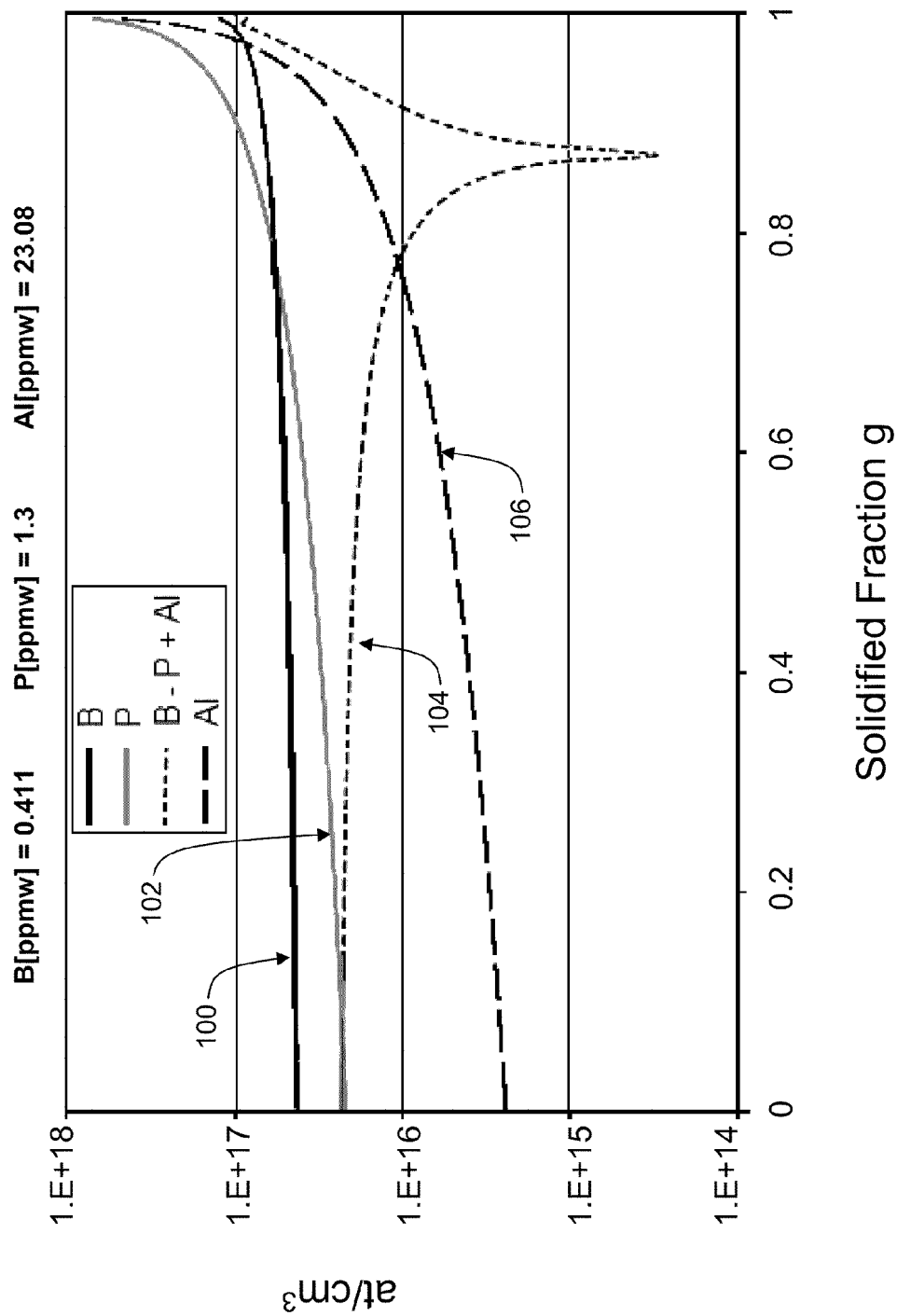
FIG. 8 is a graph showing the concentration profile of impurities boron, phosphorous, and aluminum in a UMG-Si ingot.

FIG. 8 is a graph showing the concentration profile of dopants boron 100, phosphorous 102, and aluminum 106 (in atoms per centimeter cubed over ingot height percentage translating into solidified fraction g) in a UMG material ingot. In FIG. 8, the initial concentration of boron is 0.411 ppmw, the initial concentration of phosphorous is 1.3 ppmw, and the initial concentration of aluminum is 23.08 ppmw. Due to the different segregation coefficient of boron, phosphorous, and aluminum during directional solidification there is a change of the conductivity type at approximately 87% ingot height. This change is reflected by the absolute concentration of boron and phosphorous plus the concentration of aluminum, abs(B−P+Al), shown as 104 on FIG. 8 and which defines the limit of p-type material yield.

Figure 9:
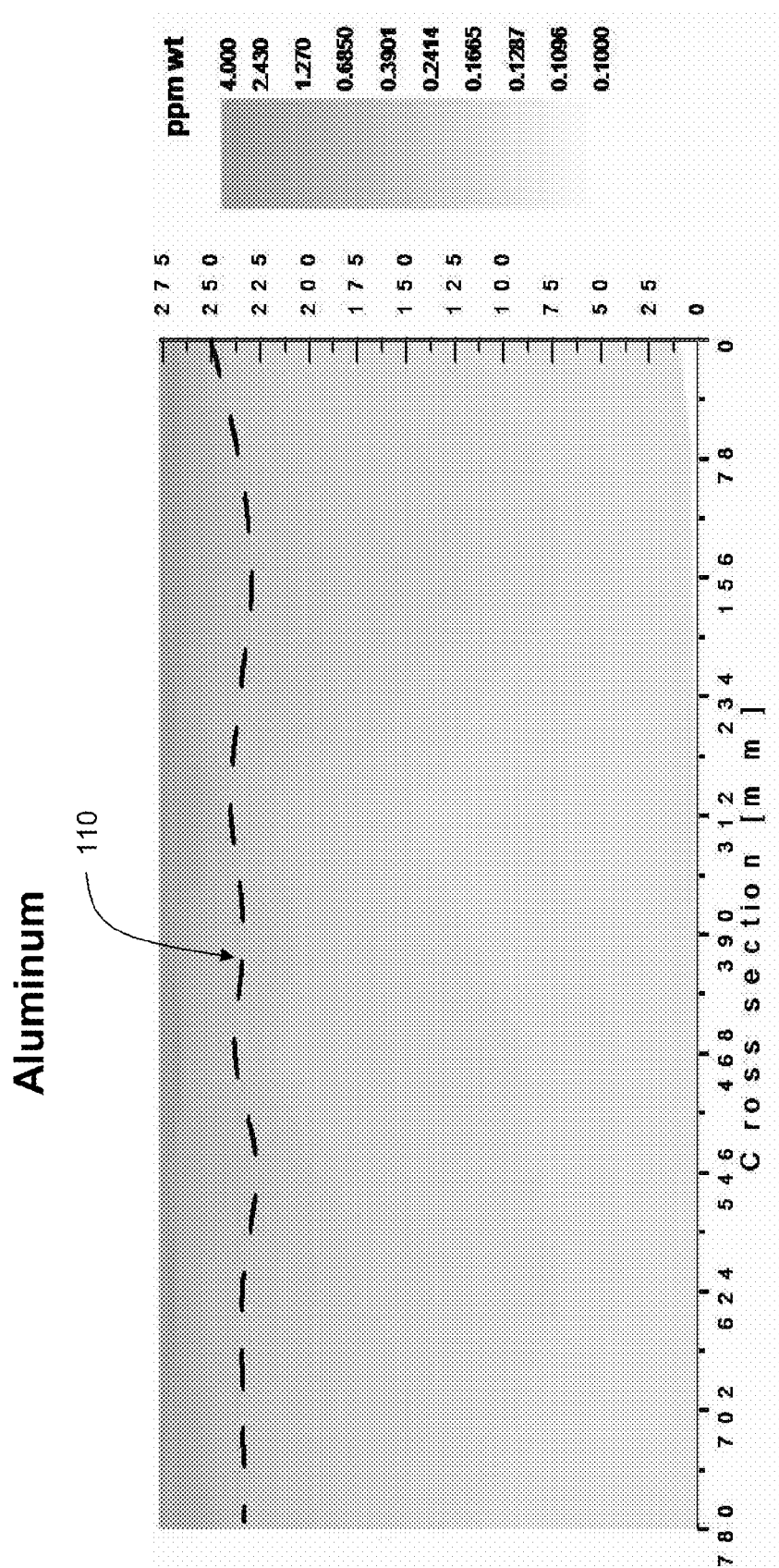
FIG. 9 is a cross sectional image of the aluminum concentration of the UMG-Si ingot depicted in FIG. 8.

FIG. 9 is a cross sectional image of the aluminum concentration profile of the UMG-Si ingot depicted in FIG. 8. Again, due to the difficulty of controlling the thermal field during the directional solidification process, the crystallization layers become uneven yielding uneven impurity concentration profiles. The concentration of aluminum increases at the top of the ingot and fluctuates throughout the cross section of the ingot as shown by impurity line 110. This makes it difficult to efficiently remove aluminum and other impurities across an entire ingot.

Figure 10:
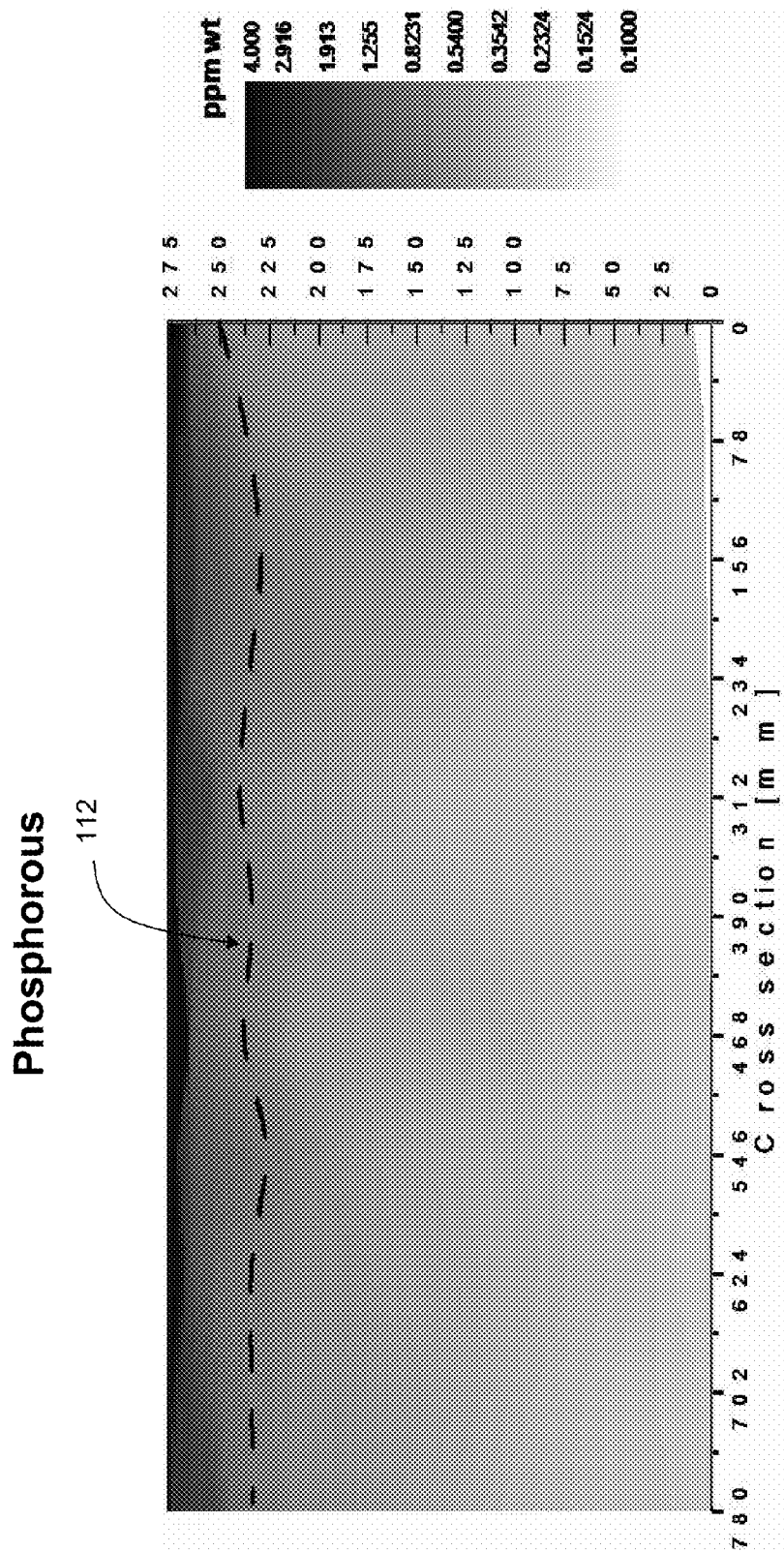
FIG. 10 is a cross sectional image of the phosphorous concentration of the UMG-Si ingot depicted in FIG. 8.

FIG. 10 is a cross sectional image of the phosphorous concentration profile of the UMG-Si ingot depicted in FIG. 8. The concentration of phosphorous increases at the top of the ingot and fluctuates throughout the cross section of the ingot as shown by impurity line 112. The concentration of phosphorous is significantly higher in certain portions of the ingot making it difficult to optimally remove the phosphorous impurities with one flat crop line along the entirety of the ingot.

Figure 11:
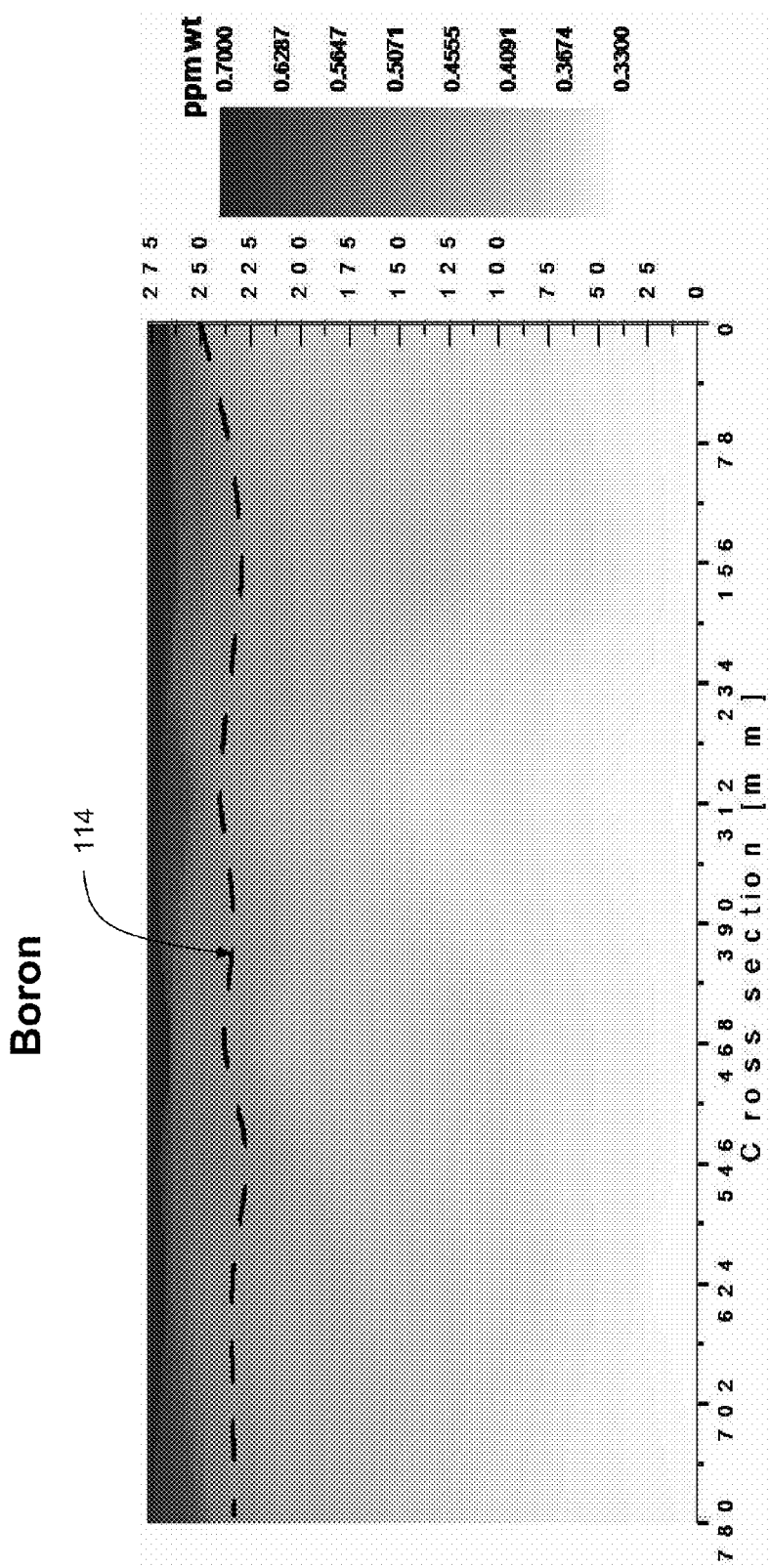
FIG. 11 is a cross sectional image of the boron concentration of the UMG-Si ingot depicted in FIG. 8.

FIG. 11 is a cross sectional image of the boron concentration profile of the UMG-Si ingot depicted in FIG. 8. The concentration of boron increases at the top of the ingot and fluctuates throughout the cross section of the ingot as shown by impurity line 114. The concentration of boron is significantly higher in certain portions of the ingot making it difficult to optimally remove the phosphorous impurities with one flat crop line along the entirety of the ingot.

Figure 12:
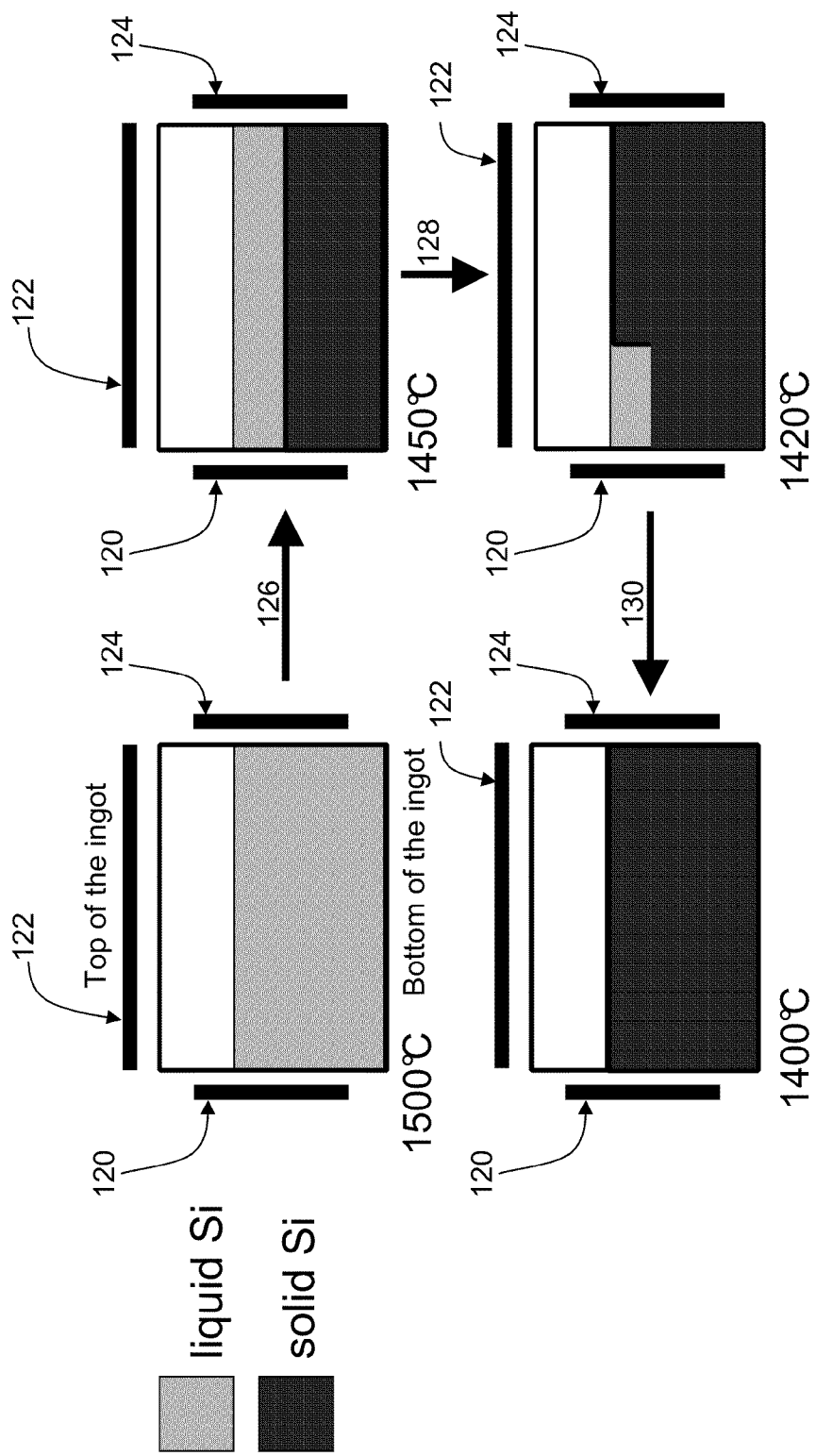
FIG. 12 is a process flow showing a side view of the solidification of silicon material in a dual directional solidification furnace.

FIG. 12 is a process flow showing a side view of the solidification of silicon material in a dual directional solidification furnace. A dual directional solidification furnace is a solidification furnace comprising a top and side heater—often arranged with a heater warming the top of the ingot and multiple heaters warming the sides of the ingot—which concentrates impurities at the top and one side of resulting silicon ingot. The dual directional solidification system of FIG. 12 utilizes top heater 122 and side heaters 120 and 124 to concentrate impurities both at the top of the ingot approximate top heater 122 and at the ingot side where side heater 120 is positioned. The liquid silicon contains concentrated impurities, and is also known as the contaminated area. At furnace temperature 1500° C., the silicon is entirely liquid. In step 126, the furnace temperature is reduced to 1450° C., and the molten silicon partly solidifies—a solidified layer of silicon forms at the bottom of the ingot below the silicon melt. The silicon proximate top heater 122 remains molten while the silicon distant from top heater 122 crystallizes and the impurities concentrate in the molten silicon. During step 126, side heater 120 and side heater 124 are set at a uniform temperature and a vertical gradient of solidified silicon forms while the horizontal solidification gradient of the silicon remains uniform.

In step 128, at furnace temperature 1420° C., the silicon is mostly crystallized and only the areas proximate to top heater 122 and side heater 120 are molten—the remaining silicon has crystallized. Side heater 124 and top heater 122 have cooled which allows the silicon proximate side heater 124 and top heater 122 to crystallize and the molten silicon moves proximate side heater 120. Impurities are concentrated in the remaining liquid silicon in the top corner of the ingot proximate heated side heater 120. Thus the impurities are concentrated in the molten area closest top heater 122 and side heater 120. This is the area which will be removed to purify the fully crystallized silicon ingot. The dual directional solidification furnace may be equipped with five holes on the top, one in the center, and four in the corners in order to control and measure the height of the solidified silicon part (often using a simple quartz rod). In step 130, at furnace temperature 1400° C., side heater 120 is cooled and the silicon ingot is entirely solidified. The impurities are concentrated in the crystallized area closest to top heater 122 and side heater 120. The ingot is now ready to be divided into bricks and the impurities removed. The dual directional solidification furnace uses the hot-zone near the heaters to concentrate impurities for efficient removal after the silicon has crystallized completely.

In process, a vertical silicon solidification gradient is created as the molten silicon in the ingot begins to solidify. As the silicon in the bottom of the ingot cools, it solidifies and impurities (boron, phosphorous, and aluminum) move into the remaining molten silicon. Before the solid/liquid interface reaches the region of overchange conductivity type (usually in the range of 80% ingot solidification) the side heaters adjust temperature to create a horizontal silicon solidification gradient which directs the remaining molten silicon to one side of the ingot—the side proximate the hotter side heater.

Figure 13:
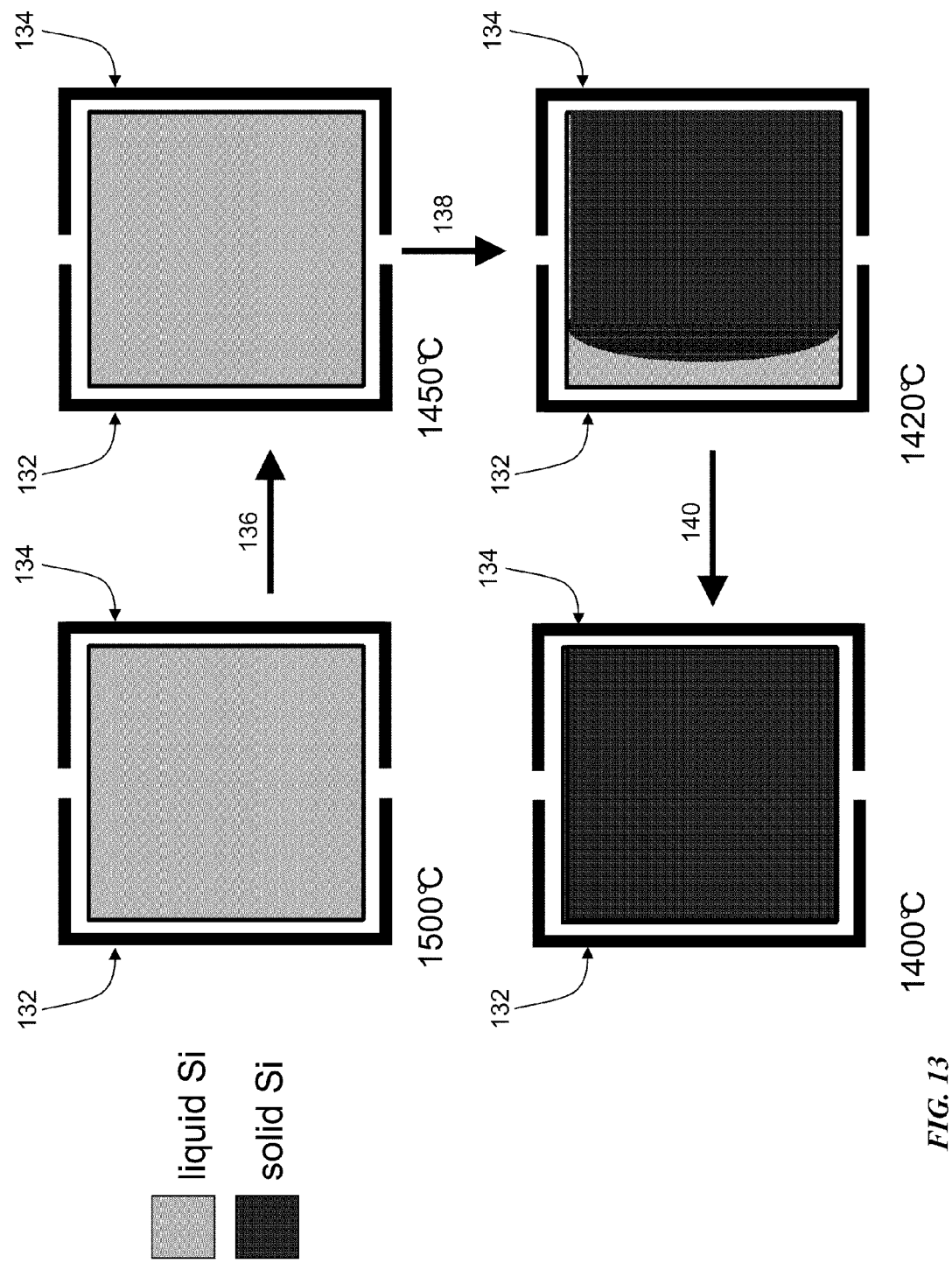
FIG. 13 is a process flow showing a top view of the solidification of silicon material in a dual directional solidification furnace.

FIG. 13 is a process flow showing a top view of the solidification of silicon material in a dual directional solidification furnace (top heater not shown). Side heater 132 and side heater 134 are adjusted together to create a horizontal silicon solidification gradient and concentrate impurities proximate side heater 132. Initially, at furnace temperature 1500° C., all silicon in the crucible is molten. In step 136, the furnace temperature is adjusted to 1450° C. and the molten silicon at the bottom of the crucible begins to solidify (see FIG. 12 for a side view of silicon solidification in a dual directional solidification furnace) while the molten silicon moves proximate the top heater.

In step 138, at furnace temperature 1420° C., side heater 132 is heated and side heater 134 is cooled—creating a horizontal silicon solidification gradient. As the silicon proximate side heater 134 cools and solidifies, the molten silicon moves proximate side heater 132. Impurities are gathered in the molten silicon proximate side heater 132. As the furnace temperature is reduced to 1400° C. in step 140, the remaining molten silicon, with concentrated impurity levels, solidifies and impurities are captured in the ingot area proximate side heater 132.

Figure 14:
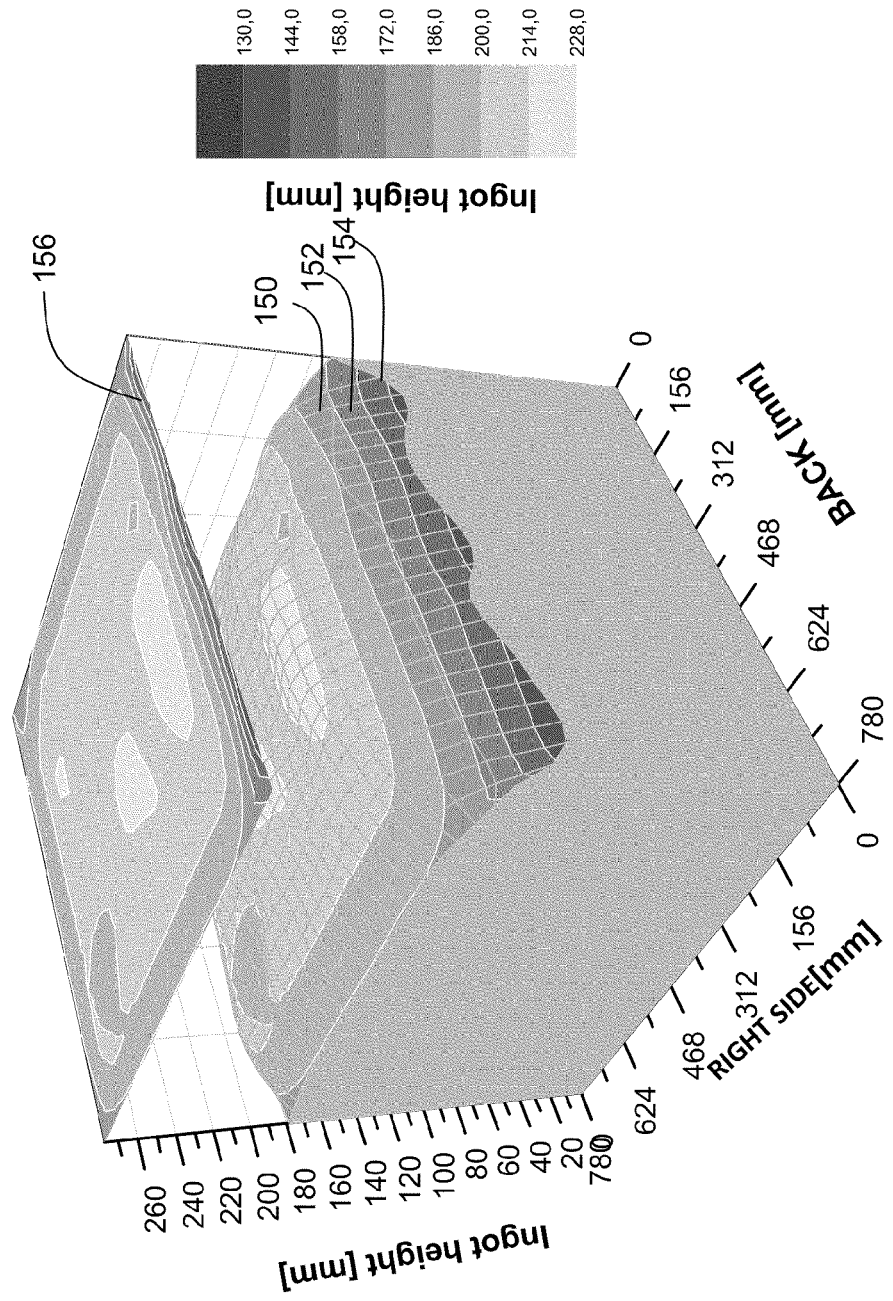
FIG. 14 is a graphical depiction of a 3-D solidification interface of a silicon ingot created in a dual directional solidification furnace.

FIG. 14 is a graphical depiction of a 3-D solidification interface of a silicon ingot created in a dual directional solidification furnace. Shown, the solid-liquid interface remained substantially planar during ingot crystallization resulting in substantially even and planar solidification layers. Thus, the impurity profiles from top to bottom are substantially the same for any region of the silicon ingot. Solidification layers 150, 152, and 154 are planar throughout the ingot, unlike layers 90, 92, and 94 in FIG. 7. Further, as shown from the top view, the contaminated solidification layers have been further concentrated on side 156 through the use of a dual directional solidification furnace, such as that shown in FIG. 13. This formation permits impurities to be concentrated in areas that may be easily cropped according to the disclosed process. The dual directional solidification furnace is preferably run using crucibles with a rectangular, non-quadratic cross section, whereby the smaller crucible side is facing the side heater.

Figure 15:
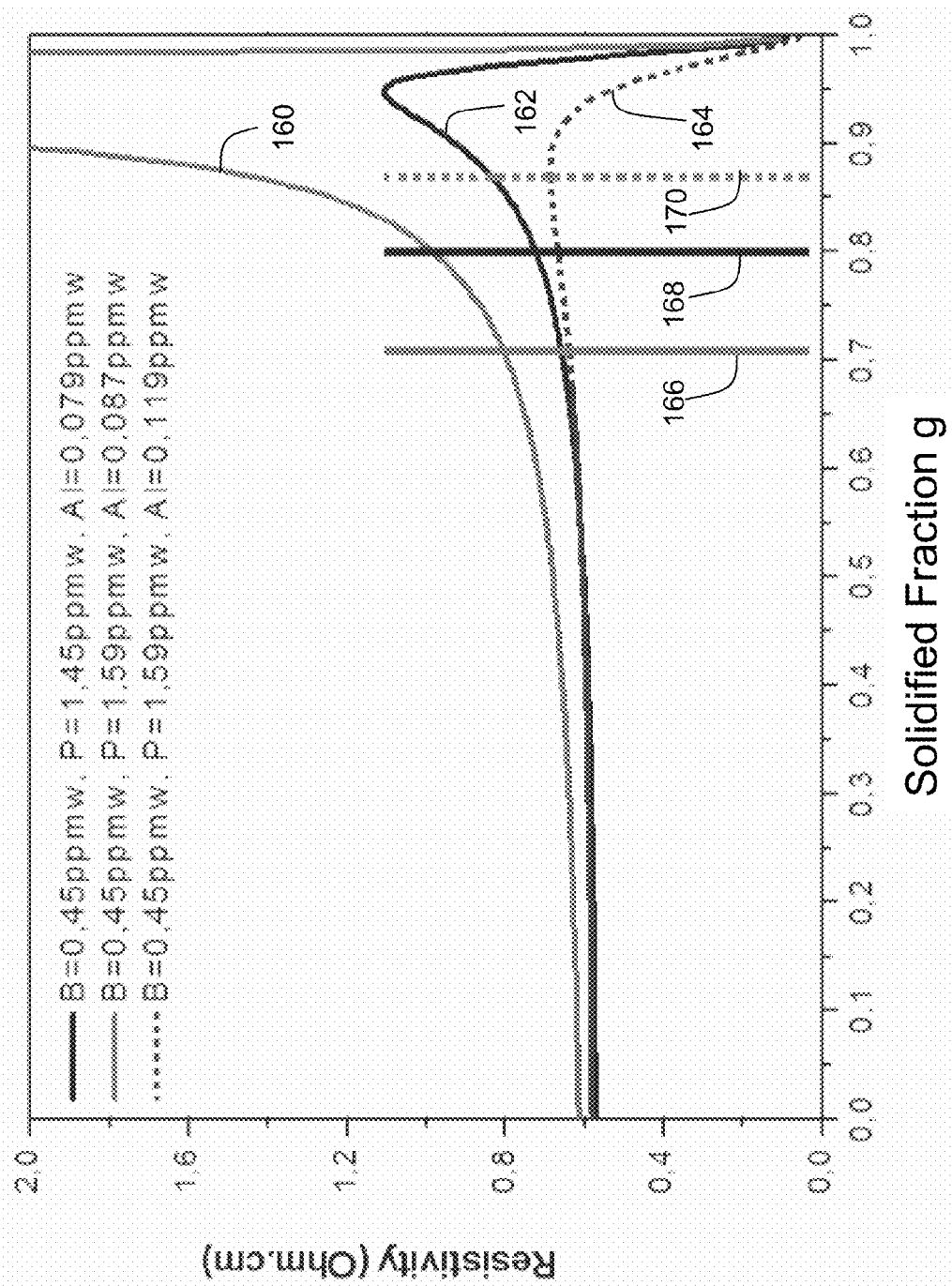
FIG. 15 is a graph showing the resistivity profiles and cropping lines for multiple impurity concentrations.

FIG. 15 is a graph showing the resistivity profiles (graphed as ohm-cm over solidified fraction g) and cropping lines for multiple concentrations of impurities. The resistivity profile is strongly dependent on the impurity concentrations. This allows a determination of the impurity concentration at each point on the resistivity profile. Crop lines 166, 168, and 170 are dependent on the resistivity profile of the ingot. The crop lines may be determined based on the threshold silicon impurity concentrations allowed for the final product.

Ingot resistivity profile 160 has a boron concentration of 0.45 ppmw, a phosphorous concentration of 1.59 ppmw, and an aluminum concentration of 0.087 ppmw. Crop line 166 corresponds to resistivity profile 160 and is the controlled cut line yielding the correct impurity concentration threshold amounts for resistivity profile 160.

Ingot resistivity profile 162 has a boron concentration of 0.45 ppmw, a phosphorous concentration of 1.45 ppmw, and an aluminum concentration of 0.079 ppmw. Crop line 168 corresponds to resistivity profile 162 and is the controlled cut line yielding the correct impurity concentration threshold amounts for resistivity profile 162.

Ingot resistivity profile 164 has a boron concentration of 0.45 ppmw, a phosphorous concentration of 1.59 ppmw, and an aluminum concentration of 0.119 ppmw. Crop line 170 corresponds to resistivity profile 164 and is the controlled cut line yielding the correct impurity concentration threshold amounts for resistivity profile 164.

Figure 16:
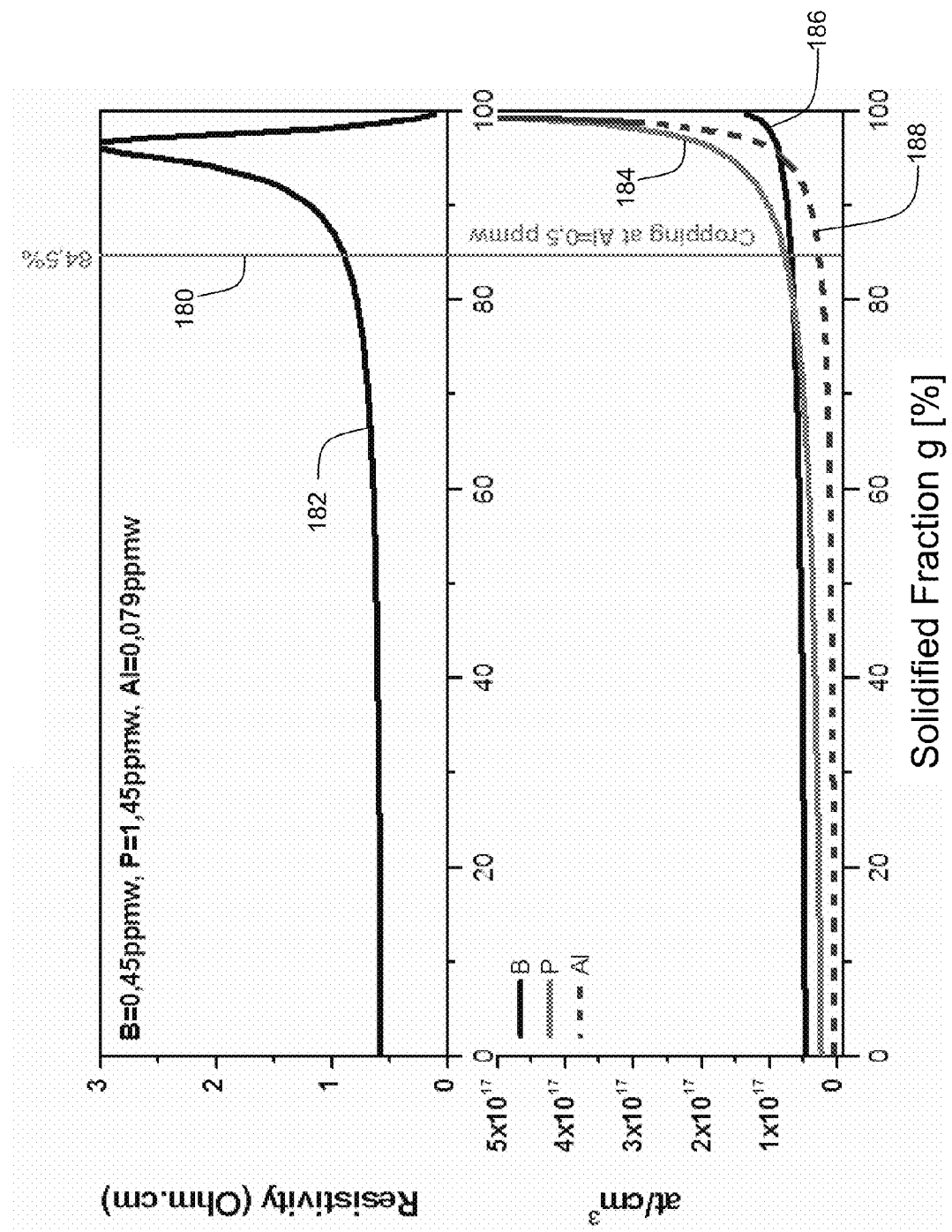
FIG. 16-18 are graphs illustrating the relationship between the resistivity profile and the impurity concentration profile of a silicon ingot.
Figure 17:
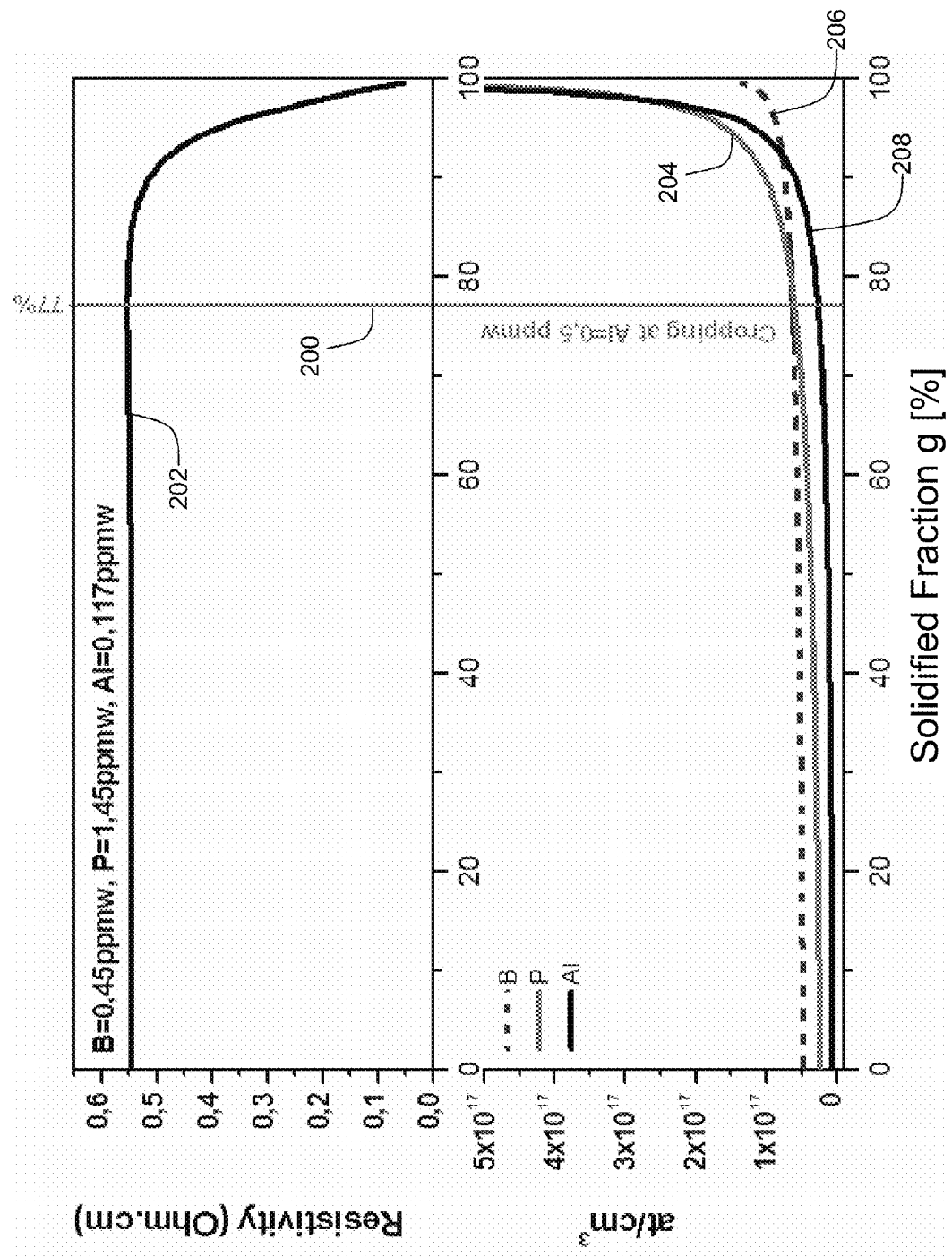
Figure 18:
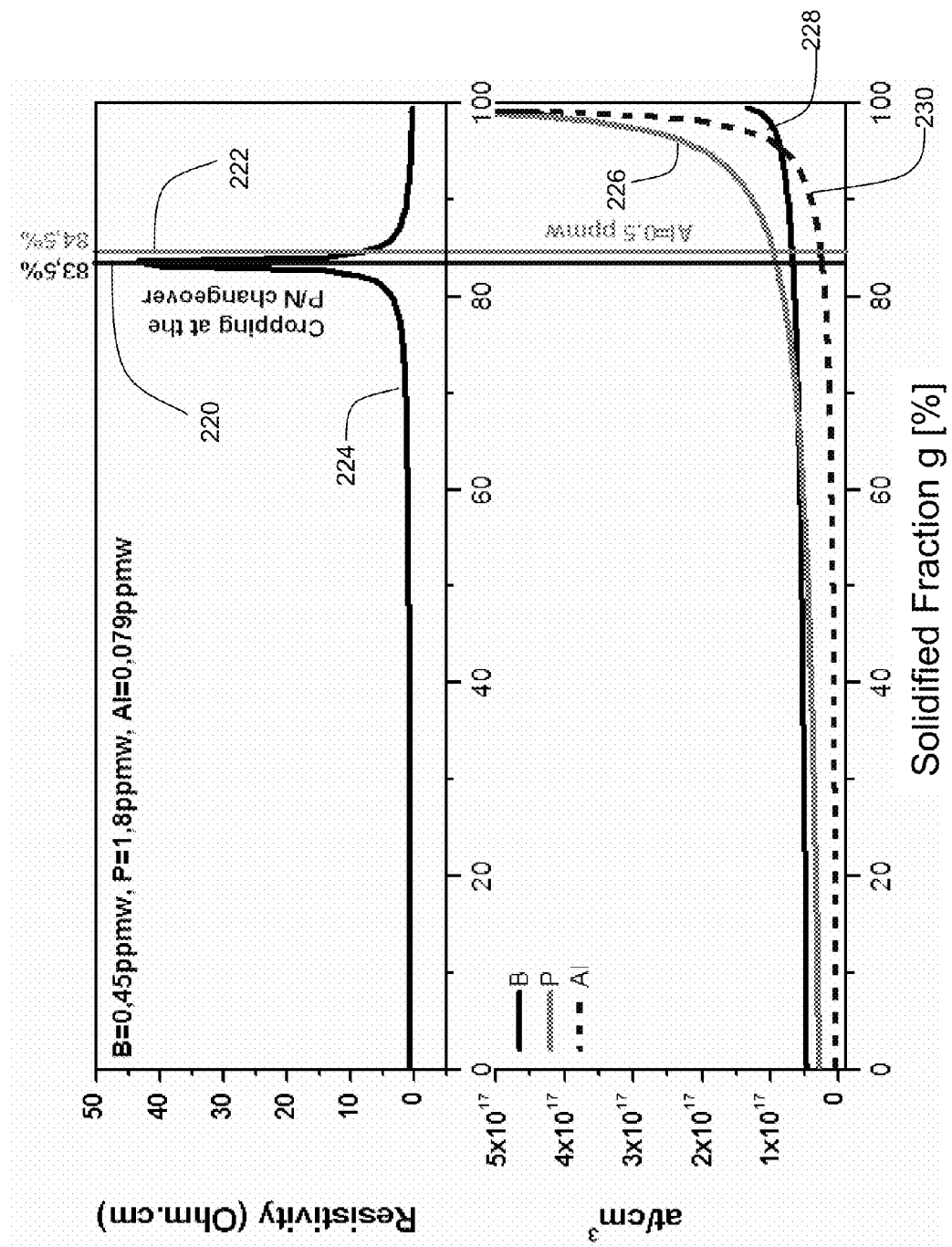

FIGS. 16-18 are graphs showing the relationship between an ingot's resistivity profile and that same ingot's impurity concentration profile. A controlled crop line may be calculated depending on the desired threshold concentration of a particular impurity. FIGS. 16-18 show the crop line based on an aluminum concentration of 0.5 ppmw, however the crop line may be based on a number of various impurities (such as boron or phosphorous) at any concentration.

FIG. 16 illustrates the calculation of a cropping line from a resistivity profile and an impurity concentration profile for the same silicon ingot. The top graph shows resistivity profile 182 (in ohm-cm over solidified fraction percentage) for a silicon ingot having a boron concentration of 0.45 ppmw, a phosphorous concentration of 1.45 ppmw, and an aluminum concentration of 0.079 ppmw. The bottom graph shows a concentration profile (in atoms per centimeter cubed over solidified fraction percentage) of boron 186, phosphorous 184, and aluminum 188 for the same ingot. Crop line 180 has been calculated at an ingot height of 84.5% for an aluminum concentration of 0.5 ppmw. Meaning the ingot below crop line 180 has an aluminum concentration of lower than 0.5 ppmw and the ingot above crop line 180 has an aluminum concentration higher than 0.5 ppmw.

FIG. 17 illustrates the calculation of a cropping line from a resistivity profile and an impurity concentration profile for the same silicon ingot. The top graph shows resistivity profile 202 (in ohm-cm over solidified fraction percentage) for a silicon ingot having a boron concentration of 0.45 ppmw, a phosphorous concentration of 1.45 ppmw, and an aluminum concentration of 0.117 ppmw. The bottom graph shows a concentration profile (in atoms per centimeter cubed over solidified fraction percentage) of boron 208, phosphorous 204, and aluminum 206 for the same ingot. Crop line 200 has been calculated at an ingot height of 77% for an aluminum concentration of 0.5 ppmw. Meaning the ingot below crop line 200 has an aluminum concentration of lower than 0.5 ppmw and the ingot above crop line 200 has an aluminum concentration higher than 0.5 ppmw.

FIG. 18 illustrates the calculation of a cropping line from a resistivity profile and an impurity concentration profile for the same silicon ingot. The top graph shows resistivity profile 224 (in ohm-cm over solidified fraction percentage) for a silicon ingot having a boron concentration of 0.45 ppmw, a phosphorous concentration of 1.8 ppmw, and an aluminum concentration of 0.079 ppmw. The bottom graph shows a concentration profile (in atoms per centimeter cubed over solidified fraction percentage) of boron 228, phosphorous 226, and aluminum 230 for the same ingot. Crop line 222 has been calculated at an ingot height of 84.5% for an aluminum concentration of 0.5 ppmw. Meaning the ingot below crop line 222 has an aluminum concentration of lower than 0.5 ppmw and the ingot above crop line 222 has an aluminum concentration higher than 0.5 ppmw. Crop line 220 has also been calculated at an ingot height of 83% from the resistivity profile at the P/N change over—where the ingot moves from p-type to n-type. This crop line reflects optimal cut line to preserve the highest yield of p-type silicon material from the ingot.

FIG. 19 is a graph showing the resistivity profiles (in ohm-cm over solidified fraction percentage) of the silicon ingots in FIGS. 16-18. Resistivity profile 182 shows the resistivity of the ingot in FIG. 16 and calculated crop line 180 at an ingot height of 84.5% for an aluminum concentration of 0.5 ppmw. Resistivity profile 102 shows the resistivity of the ingot in FIG. 17 and calculated crop line 200 at an ingot height of 77% for an aluminum concentration of 0.5 ppmw. Resistivity profile 224 shows the resistivity of the ingot in FIG. 18 and calculated crop line 220 at an ingot height of 83.5% at the P/N changeover.

FIG. 20 presents the corresponding concentration profiles of boron, phosphorous, and aluminum for resistivity profiles 182, 202, and 224 in FIG. 19.

FIGS. 21 through 33 are directed towards a control process and method for evaluating UMG-Si feedstock quality. By analyzing the resistivity profiles of crystallized ingot test samples made from multiple UMG-Si feedstock batches, the boron and phosphorous content of those batches may be determined (and thus a determination of the quality of the UMG-Si feedstock may be made). Further, other impurities such as, but not limited to, SiC inclusions may also be detected.

FIG. 21 is a graphic depiction showing a prior art process flow for reducing boron, phosphorous, and aluminum content in silicon according to an inductively coupled plasma mass spectrometry (ICPMS) process. In step 210, pure raw materials, such as quartz and coal, are selected to produce MG-Si with low boron content. Step 212 then reduces the aluminum content further through MG-Si refinement. Additionally, boron content could be reduced further, for example in a furnace with an oxygen fuel burner—leading ultimately to UMG-Si. Then to further reduce impurities such as boron, phosphorous, and aluminum, a chemical analysis of the UMG-Si is performed applying ICPMS (shown as step 214). If the analysis gives a boron concentration less than a specified threshold concentration (shown as 1 ppmw), the feedstock is regarded as ready for crystallization and will be shipped for casting ingots, shown as final UMG-Si product 216. However, if the boron concentration is measured to be greater than the specified threshold concentration (shown as 1 ppmw), then the refinement process may be repeated until the material is a proper UMG-Si product meeting the minimum boron threshold concentration levels. Importantly, other threshold concentration levels for boron may be used of other impurities, such as phosphorous.

More effective impurity controls are necessary to provide purer silicon while minimizing waste. The disclosed subject matter provides for an alternative to the chemical analysis (ICPMS) described above and, instead, introduces another process and method for controlling UMG-Si feedstock quality. The disclosed control method analyzes the resistivity profiles of test ingots of the UMG-Si before the feedstock is released. This control method uses electrical data of reasonably large test ingots made from feedstock batches to be controlled. Specifically, measurements of resistivity profiles from bottom to top of test ingots are criteria of releasing UMG-Si feedstock batches as product.

As part of the disclosed process, a method for testing a plurality of test ingots at the same time is provided, using a specially designed crystal grower with a hot zone that can include top and bottom heaters or only a top heater such as the dual directional solidification furnace shown in FIGS. 12 and 13. Thus, crystal growers having an N by N number of crucibles may grow and test N×N test ingots. This procedure further improves the method for controlling feedstock quality.

FIGS. 22 and 23 are graphs showing actual measured resistivity of various batches of UMG-Si feedstock. Note the large UMG-Si feedstock variability from the batch in FIG. 22 to the batch in FIG. 23 of resistivity—and thus yield. The graphs of FIGS. 22 and 23 show the resistivity profiles (in ohm-cm over ingot height from bottom to top) of two ingots grown from two batches out of the same feedstock. Note that the resistivity profile reflects the change in conductivity type caused by the segregation characteristics of boron and phosphorous in the ingot. The 150 mm tall ingot in FIG. 22 has a P/N change over—the point where the ingot moves from p-type to n-type—at about 75 mm, leaving about a 45% yield of p-type UMG-Si (shown as reference numeral 218) for use. Table 219 provides resistivity data for the batch depicted in the resistivity profile of FIG. 22 including mean, median, minimum and maximum resistivity values in ohm-cm. The 150 mm tall ingot in FIG. 23 has a P/N change over at about 110 mm, leaving about a 74% yield of p-type UMG-Si (shown as reference numeral 220) for use. Table 221 provides resistivity data for the batch depicted in the resistivity profile of FIG. 23 including mean, median, minimum and maximum resistivity values in ohm-cm.

This large variability originates mainly from incoming materials such as, but not limited to, quartz and coal. The present disclosure proposes a method and process to control this variability before using such feedstock for casting industrial-size ingots, which are then used for making solar cells after wafering.

FIG. 24 displays the ICPMS data of B (boron) and P (phosphorous) for exemplary test ingots of a simultaneous directional solidification run on four different batches—Batch 1, Batch 2, Batch 3, and Batch 4—in a four crucible run. Table 224 shows the measured boron and phosphorous concentrations for Batch 1 and Batch 2. Table 226 shows the measured boron and phosphorous concentrations for Batch 3 and Batch 4. The corresponding resistivity profiles are shown in FIG. 25 for Batch 1, FIG. 26 for Batch 2, FIG. 27 for Batch 3, and FIG. 28 for Batch 4. Here, the resistivity data are not in agreement with ICPMS based expectations. For example, one would expect similar resistivity profiles for Batch 1 (as shown in FIG. 25) and Batch 3 (as shown in FIG. 27) based on the measured values of boron and phosphorous. The measured resistivity profiles for each batch allow for a realistic evaluation of the feedstock quality—and not a chemical analysis.

At the same time, the amount of potential co-dopants may also be determined based on resistivity profiles in order to modify individual feedstock batches—thus ensuring high p-type yields and a useful resistivity range after co-doping.

FIG. 25 is a graph showing the measured resistivity data (resistivity profile 230) for Batch 1 in FIG. 24 in resist in ohm-cm over ingot height from bottom to top. Batch 1 P/N change over at about 120 mm, leaving about a 73% yield of UMG-Si (shown as reference numeral 234). Table 232 provides resistivity data for Batch 1 including mean, median, minimum and maximum resistivity values in ohm-cm.

FIG. 26 is a graph showing the measured resistivity data (resistivity profile 236) for Batch 2 in FIG. 24 in resist in ohm-cm over ingot height from bottom to top. Batch 2 P/N change over at about 45 mm, leaving about a 26% yield of UMG-Si (shown as reference numeral 240). Table 238 provides resistivity data for Batch 2 including mean, median, minimum and maximum resistivity values in ohm-cm.

FIG. 27 is a graph showing the measured resistivity data (resistivity profile 240) for Batch 3 in FIG. 24 in resist in ohm-cm over ingot height from bottom to top. Batch 3 P/N change over at about 50 mm, leaving about a 28% yield of UMG-Si (shown as reference numeral 246). Table 242 provides resistivity data for Batch 3 including mean, median, minimum and maximum resistivity values in ohm-cm.

FIG. 28 is a graph showing the measured resistivity data (resistivity profile 248) for Batch 4 in FIG. 24 in resist in ohm-cm over ingot height from bottom to top. Batch 4 P/N change over at about 70 mm, leaving about a 41% yield of UMG-Si (shown as reference numeral 252). Table 250 provides resistivity data for Batch 4 including mean, median, minimum and maximum resistivity values in ohm-cm.

FIG. 29 is a photograph of a casted ingot from bottom to top. The present disclosure describes a method for controlling the quality of UMG-Si feedstock by producing a small test ingot from every batch of silicon feedstock followed by measuring the resistivity from bottom to top. This process enables determination of growth conditions for ingots. One exemplary embodiment produces 450 kg ingots and specifies growth conditions for increasing p-type yield and resistivity control. However, present disclosure enables other such growth conditions.

FIG. 30 pictorially depicts embodiments of crystal grower crucible configurations in accordance with the disclosed subject matter. To control feedstock quality, the present disclosure determines the concentration of boron and phosphorous of feedstock materials from the bottom to top resistivity profiles of simultaneously grown (according to a directional solidification process) test ingots, using multi-crucible crystal growers that may adapt various setups, such as those shown in FIG. 30. Crystal grower formation 262 has a 2×2 crucible formation that may grow up to 4 test ingots during the same run. Crystal grower formation 264 has a 3×3 crucible formation that may grow up to 9 test ingots during the same run. Crystal grower formation 266 has a 4×4 crucible formation that may grow up to 16 test ingots during the same run. Crystal grower formation 268 has a 6×6 crucible formation that may grow up to 36 test ingots during the same run. Other crucible formations may also be used such as larger configurations (such as 7×7) or oblong rectangular formations (such as 2×3, 3×2, 3×4, or 4×3) or any variation thereof.

In an exemplary embodiment, the test ingots may weigh in the range of 15 kg and the process grows these test ingots during the same run from different feedstock batches. Experimental tests confirm valid characterization of the entire feedstock batch with this method. Typically, feedstock batches may range from 2000 kg to 6000 kg.

Further, the determination and controlling of boron and phosphorous in feedstock materials may be supplemented by detection of SiC contamination. This may be done by detecting "inclusions" in ingots from such feedstock materials using IR inspection.

The crucibles including the batches of feedstock materials in FIG. 30 may be covered by lids made from high purity graphite or other such materials, in order to avoid cross contamination during crystallization. The configurations shown in FIG. 30 are examples of possible configurations for casting and testing different feedstock batches simultaneously. In another embodiment, other configurations may use different crucible shapes such as cylindrical shape.

FIG. 31 is a photographic representation showing a modification a single crucible thermal configuration to four (4) crucibles thermal configuration per directional solidification run. Single crucible crystal grower 270 has been modified to four crucible crystal grower 272. Thus, four test ingots per directional solidification run may be grown simultaneously (as shown by the picture depicted in reference numeral 274).

In this embodiment, individual ingot size allows for production of six (6) inch solar cells. The method of the present disclosure allows quick and reliable control of B/P ratio. The embodiment shown in FIG. 31 may be scaled, for example, to thirty-six (36) ingots per run corresponding to a feedstock batch size of 50 MT of UMG-Si feedstock material.

The relatively small size of those test ingots allows for well controlled crystallization using industrial scale crystallization furnaces with specially designed components for assuring thermal and gas flow symmetry. One ingot test per feedstock batch for B/P ratio confirmation is used, and further analysis such as detection of SiC inclusions may follow.

FIG. 32 is photographic examples showing silicon carbide (SiC) impurities found in actual UMG-Si ingots. Note the varying degree of SiC inclusions in ingot 276, ingot 278, and ingot 280. SiC inclusions may be determined through an infrared imaging (IR) process. Often, depending on the process conditions at a feedstock supplier's site, SiC inclusions may be formed from one batch to the other. Since feedstock with SiC inclusions produces ingots with inclusions, better control processes at a feedstock supplier's site allows production of inclusion-free ingots at the user's (such as a solar cell manufacturer) site. In one embodiment, the multi-crucible setup allows reliable process control of feedstock materials. Multi-crucible casting based control methodology is also applicable to characterize incoming feedstock material for feedstock users.

FIG. 33 is a process flow showing major steps of one embodiment of the disclosed UMG-Si control process. In step 290, the feedstock material batches are selected for analysis. Typically, the batch size ranges from approximately two (2) to six (6) MT. For acceptable testing, the analysis batch size vs. feedstock batch size should be greater than $2 \times 10^{-3}$. This ratio is 3-4 orders of magnitude greater than current practice based on chemical analysis of UMG-Si feedstock.

In step 292, crystallization of the test batches occurs. The size and shape of the crucibles typically allows for ingots capable of yielding wafers on the order of 156 mm×156 mm. Further, since the disclosed process analyzes a plurality of batches in a single run, symmetrical thermal and gas flow conditions for all crucibles and test batches should be present.

In step 294, resistivity profiles of the individual ingots are measured. From this resistivity measurement, the concentrations of boron and phosphorous may be determined.

Optional step 296 determines co-dopants which may be used to increase ingot yield and produce appropriate resistivity profiles based on the amount of boron and phosphorous in the feedstock batches analyzed. Optional step 298 determines SiC inclusions in the test ingots through IR analysis. And optional step 300 produces test wafers for extensive assessment of the feedstock batches.

In operation, the disclosed subject matter provides a quality control method to determine the concentrations of impurities in an UMG-Si feedstock batch based on the resistivity profile of a test ingot made UMG-Si from the batch. Multiple test ingots, each corresponding to a UMG-Si feedstock batch, may be grown simultaneously according to a directional solidification process.

Although the disclosed subject matter has been described in detail, it should be understood that various changes, substitutions, and alterations can be made hereto without departing from the spirit and scope of the invention as defined by the appended claims.

What is claimed is:

1. A control method for evaluating the quality of a UMG-Si feedstock, the method comprising the steps of:
   performing a directional solidification of molten upgraded metallurgical-grade silicon (UMG-Si) from a UMG-Si feedstock batch to form a silicon test ingot;
   measuring the resistivity from top to bottom of said silicon test ingot;
   mapping the resistivity profile of said silicon test ingot;
   calculating the phosphorus and boron concentrations of said UMG-Si feedstock batch based on said resistivity profile of said silicon test ingot; and
   determining, based on the resistivity profile of said silicon test ingot, an amount of at least one co-dopant for use in said UMG-Si feedstock batch for increasing an ingot yield and producing an improved resistivity profile by directional solidification.

2. The method of claim 1, wherein said step of calculating the phosphorus and boron concentrations of said selected UMG-Si feedstock batch based on said resistivity profile of said silicon test ingot further comprises the step of calculating the phosphorus and boron concentrations of said selected UMG-Si feedstock batch based on the yield of said silicon test ingot determined from said resistivity profile of said silicon test ingot.

3. The method of claim 1, further comprising the step of determining SiC inclusions in said silicon test ingot through IR imaging analysis.

4. The method of claim 1, further comprising the step of producing test wafers from said silicon test ingot.

5. The method of claim 1, wherein the weight ratio of said silicon test ingot to said UMG-Si feedstock batch is greater than $2 \times 10^{-3}$.

6. The method of claim 1, wherein said silicon test ingot weighs approximately 15 kg.

7. The method of claim 1, wherein said step of performing a directional solidification uses a dual directional solidification furnace that concentrates impurities on the top and one side of said silicon test ingot.

8. A control method for evaluating the quality of UMG-Si feedstock, the method comprising the steps of:
   performing a simultaneous directional solidification of molten UMG-Si from a plurality of UMG-Si feedstock batches in a single crystal grower to form a plurality of silicon test ingots, wherein each of said plurality of silicon test ingots corresponds to a particular UMG-Si feedstock batch;
   measuring the resistivity from top to bottom of each of said silicon test ingots;
   mapping the resistivity profile of each of said silicon test ingots;
   calculating the phosphorus and boron concentrations of each of said UMG-Si feedstock batches based on said resistivity profile of each of said corresponding silicon test ingot; and
   determining, based on the resistivity profiles of said silicon test ingots, an amount of at least one co-dopant for use in said plurality of UMG-Si feedstock batches for increasing an ingot yield and producing an improved resistivity profile by directional solidification.

9. The method of claim 8, wherein said step of performing a simultaneous directional solidification of molten UMG-Si from a plurality of UMG-Si feedstock batches in a single crystal grower to form a plurality of silicon test ingots, wherein each of said plurality of silicon test ingots corresponds to a particular UMG-Si feedstock batch further comprises performing a simultaneous directional solidification of molten UMG-Si from a plurality of UMG-Si feedstock batches in a single multi-crucible crystal grower to form a plurality of silicon test ingots, wherein each of said plurality of silicon test ingots corresponds to particular UMG-Si feedstock batch.

10. The method of claim 8, wherein said step of calculating the phosphorus and boron concentrations of each of said UMG-Si feedstock batches based on said resistivity profile of each of said corresponding silicon test ingots further comprises the step of calculating the phosphorus and boron concentrations of each of said selected UMG-Si feedstock batches based on the yield of each of said silicon test ingots determined from said resistivity profile of each of said silicon test ingots.

11. The method of claim 8, further comprising the step of determining SiC inclusions in said silicon test ingot through IR imaging analysis.

12. The method of claim 8, further comprising the step of producing test wafers from each of said silicon test ingots.

13. The method of claim 8, wherein the weight ratio of each of said silicon test ingots to each of said corresponding UMG-Si feedstock batches is greater than $2 \times 10^{-3}$.

14. The method of claim 8, wherein each of said silicon test ingots weighs approximately 15 kg.

15. The method of claim 8, wherein said step of performing a directional solidification uses a dual directional solidification furnace that concentrates impurities on the top and one side of each of said silicon test ingots.

16. The method of claim 8, wherein said step of performing a simultaneous directional solidification of molten UMG-Si from a plurality of UMG-Si feedstock batches in a single crystal grower to form a plurality of silicon test ingots, wherein each of said plurality of silicon test ingots corresponds to particular UMG-Si feedstock batch further comprises performing a simultaneous directional solidification of molten UMG-Si from a plurality of UMG-Si feedstock batches in a single multi-crucible crystal grower having an N×N crucible formation to form a plurality of silicon test ingots, wherein each of said plurality of silicon test ingots corresponds to a particular UMG-Si feedstock batch.

* * * * *